(12) United States Patent
Hoff et al.

(10) Patent No.: US 8,587,617 B2
(45) Date of Patent: Nov. 19, 2013

(54) APPARATUS AND METHOD FOR MAP ZOOMING

(75) Inventors: Christopher G. Hoff, Huntington Beach, CA (US); Erwin Ward Bathrick, III, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 960 days.

(21) Appl. No.: 12/700,313

(22) Filed: Feb. 4, 2010

(65) Prior Publication Data

US 2010/0194784 A1  Aug. 5, 2010

Related U.S. Application Data

(60) Provisional application No. 61/149,772, filed on Feb. 4, 2009.

(51) Int. Cl.
*G09G 5/00* (2006.01)

(52) U.S. Cl.
USPC .................. 345/661; 701/532; 340/995.15

(58) Field of Classification Search
None
See application file for complete search history.

(56) References Cited

U.S. PATENT DOCUMENTS

| | | | |
|---|---|---|---|
| 4,661,811 A | 4/1987 | Gray et al. | |
| 4,847,788 A | 7/1989 | Shimada | |
| 5,161,886 A | 11/1992 | De Jong et al. | |
| 5,615,384 A | 3/1997 | Allard et al. | |
| 5,687,307 A | 11/1997 | Akisada et al. | |
| 5,884,217 A | 3/1999 | Koyanagi | |
| 6,011,566 A | 1/2000 | Salamon | |
| 6,067,112 A | 5/2000 | Wellner et al. | |
| 6,125,367 A * | 9/2000 | Na | .................. 701/455 |
| 6,141,014 A | 10/2000 | Endo et al. | |
| 6,205,181 B1 | 3/2001 | Hu et al. | |
| 6,341,254 B1 | 1/2002 | Okude et al. | |
| 6,421,134 B1 | 7/2002 | Kuroshima et al. | |
| 6,556,185 B2 | 4/2003 | Rekimoto | |
| 6,611,753 B1 | 8/2003 | Millington | |

(Continued)

FOREIGN PATENT DOCUMENTS

| | | |
|---|---|---|
| EP | 0 510 939 A2 | 10/1992 |
| EP | 0 510 939 A3 | 10/1992 |

(Continued)

*Primary Examiner* — James A Thompson
*Assistant Examiner* — David H Chu
(74) *Attorney, Agent, or Firm* — Daly, Crowley, Moffors & Durkee, LLP

(57) ABSTRACT

An apparatus for map zooming includes instructions stored in a memory that when executed by a processor render a zoom bar. The zoom bar includes a plurality of map scale hash marks arranged along an axis of the zoom bar and indicative of a map scale range of a geographic map. The plurality of map scale hash marks include a first map scale hash mark representative of a first map scale, a second map scale hash mark offset along the zoom bar axis from the first map scale hash mark and representative of a second map scale, and a map transformation hash mark located between the first and second map scale hash marks and representative of a transformation of the geographic map from a first map data set defined with reference to the first map scale to a second map data set defined with reference to the second map scale. The zoom bar further includes a map zoom bar indicator located relative to the first and second map scale hash marks and corresponding to a current map display scale and a zoom level of the geographic map.

49 Claims, 13 Drawing Sheets

(56) References Cited

U.S. PATENT DOCUMENTS

| | | |
|---|---|---|
| 6,681,056 B1 | 1/2004 | Tseng et al. |
| 6,721,952 B1 | 4/2004 | Guedalia et al. |
| 6,836,270 B2 | 12/2004 | Du |
| 7,230,632 B2 | 6/2007 | Coldefy et al. |
| 7,379,063 B2 | 5/2008 | Hoff |
| 2001/0034588 A1 | 10/2001 | Agrawals et al. |
| 2001/0038718 A1 | 11/2001 | Kumar et al. |
| 2002/0145610 A1 | 10/2002 | Barilovits et al. |
| 2004/0056861 A1 | 3/2004 | Huber et al. |
| 2004/0100471 A1 | 5/2004 | Leather et al. |
| 2004/0165775 A1 | 8/2004 | Simon et al. |
| 2004/0201596 A1* | 10/2004 | Coldefy et al. ............ 345/660 |
| 2005/0031197 A1 | 2/2005 | Knopp |
| 2005/0033511 A1 | 2/2005 | Pechatnikov et al. |
| 2005/0184993 A1 | 8/2005 | Ludwin et al. |
| 2005/0270311 A1* | 12/2005 | Rasmussen et al. ......... 345/677 |
| 2007/0014488 A1 | 1/2007 | Chen et al. |
| 2008/0086699 A1* | 4/2008 | Antikainen et al. ......... 715/784 |
| 2008/0178118 A1* | 7/2008 | Ishii et al. .................... 715/810 |
| 2008/0209332 A1* | 8/2008 | Chevsky et al. ............. 715/736 |
| 2008/0253757 A1 | 10/2008 | Bells et al. |
| 2009/0061948 A1 | 3/2009 | Lee et al. |
| 2009/0182500 A1* | 7/2009 | Dicke ........................... 701/208 |
| 2009/0198767 A1 | 8/2009 | Jakobson et al. |
| 2010/0010958 A1* | 1/2010 | Perrow et al. .................... 707/1 |
| 2010/0198495 A1* | 8/2010 | O'Clair ........................ 701/200 |

FOREIGN PATENT DOCUMENTS

| | | |
|---|---|---|
| EP | 0 738 874 A3 | 10/1996 |
| EP | 0 738 874 B1 | 10/1996 |
| EP | 0 841 537 A3 | 5/1998 |
| EP | 0 841 537 B1 | 5/1998 |

* cited by examiner

920

```
In response to an input event, update the zoom bar        922
position by updating the midpoint hash mark position,
the upper transition latitude per pixel hash mark position,
and the lower transition latitude per pixel hash mark
```

↓

```
Determine an updated current map data set                 924
based upon the updated zoom bar position
```

↓

```
Calculate a percent fixed position value based upon a     926
relationship of the fixed zoom bar indicator position to the
upper transition latitude per pixel hash mark position or the lower
transition latitude per pixel hash mark position.
```

↓

```
Calculate the current map display scale factor            928
based upon the percent fixed position value
```

*FIG. 8B*

APPARATUS AND METHOD FOR MAP ZOOMING

CROSS-REFERENCE TO RELATED APPLICATIONS

This application claims priority under 35 U.S.C. §119(e) from U.S. Provisional Patent Application No. 61/149,772, filed Feb. 4, 2009, which application is hereby incorporated herein by reference in its entirety for all purposes.

FIELD OF THE INVENTION

The system and techniques described herein relate generally to map display and more particularly to an apparatus and method for map zooming.

BACKGROUND

As is known in the art, a map is a visual representation of a geographic. A map may include symbolic depictions highlighting relationships between elements of a space or a defined geographic region such as objects, regions within the defined geographic region, and themes. Some maps are static two-dimensional, geometrically accurate representations of a three-dimensional space, while others are dynamic or interactive, even three-dimensional. Although most commonly used to depict geographic regions, maps may also represent any space, real or imagined, without regard to context or scale.

As is also known, map imagery data (i.e. data which represents a map image) can be stored as a digital image. A digital image is an image which may be represented as a two-dimensional array of pixels with each of the pixels represented by a digital word. A digital image can be stored in electronic devices which utilize computer programs (also referred to as applications) to render the map imagery data on a display for viewing by a user (e.g. via a display screen on the electronic device).

As is also known, map imagery data may be stored in one or more databases. There are a variety of types of map databases. One particular type of map database is a compressed arc digitized raster graphic (CADRG) database. A CADRG database includes map data that is separated into discreet groupings, each representing a particular geographic or map scale. A map data viewer system provides a means and method of displaying map data from such a database. Typically, the user of such an application must provide three inputs as follows: (1) a location (2) a map scale; and (3) and a selection of the map data to display. Depending upon how these inputs are presented in a graphical user interface (GUI), they can present significant complexity to the user.

As is further known, many map data viewer systems provide a combination box/toggling mechanism which allows a user to switch between different map scales. Other systems render all the scales overlaid into one view. Finally, systems such as Google™ Earth, which are able to directly control a map data set, provide satellite imagery (i.e., imagery of the Earth's surface) taken at different discreet scales to emphasize different surface features.

U.S. Pat. No. 7,379,063, assigned to the assignee of the present application, describes a system and technique for scaling, rotating, and translating map data on a low power platform. The system and technique described therein explains a way to place different "maps" (bitmaps) into a single "world space" coordinate system. The process can be compared to taking multiple satellite images of an area, concatenating them together into a single satellite image, which can then be zoomed/rotated/translated.

SUMMARY OF THE INVENTION

In general overview, the concepts, techniques, and systems described herein provide a zoom bar which adapts its world space coordinate system to reflect, control, and transform map data displayed in a geographic map. The zoom bar enables continuous map zooming of map data and smooth transitions from one map data set to another map data set, as may occur during viewing and browsing of the map. In this way, the zoom bar allows a user to easily transition between different map data sets based upon needed or desired map information, such as local roads at one map scale, state/county routes at another map scale, and/or interstate freeways at yet another map scale.

The zoom bar described herein minimizes and/or eliminates the complexity found in conventional map zooming in which a map user is forced to understand and distinguish between map scales (i.e., the user is forced to understand what type and/or detail of information is defined at various map scales) to obtain needed or desired information. Furthermore, conventional map zooming requires the map user to toggle/switch between map scales using individual controls, such as toggle buttons. A user may have difficultly operating such toggle buttons (e.g., a user may have difficulty touching toggle buttons on a touch screen to actuate the button), especially on a portable device with a relatively small display screen and, accordingly, even smaller graphical user interface components. User difficulties may be exacerbated in certain operating environments, for example, those that require a user to wear gloves (as may be the case during inclement weather or to safeguard hands).

In addition, toggling a map from one setting to another can produce abrupt changes in the map display, for example, from one map data set to another map data set with incongruent map scales. Such abrupt changes can severely disorient the map user (and may slow down user response times during critical operations). Furthermore, it may be difficult for a user to read and/or adapt to the changed map view, especially when the level of detail significantly changes.

In one embodiment, the systems and techniques described herein operate to provide map scaling using a "zoom bar" graphical user interface (GUI) component. The zoom bar can be provided as a continuous bar having map scale hash marks (including, but not limited to, lines, dots, and geometric shapes) for each map scale in a map. The map scale hash marks in combination represent a map scale range of the map. In a further embodiment, a zoom bar provides map scale marks for each map scale of a map in ascending order of geo-location scaling of map data.

In some embodiments, map data includes, but is not limited to, map imagery which refers to pixel data representative of map information and, in particular, a picture of the Earth's surface. Map imagery can be provided in various formats based on scanning/imaging technologies, display formats and platforms, and/or to emphasize certain geographic features, such as land and/or water features, urban features, vegetation, radiation, etc. Map imagery pixel has a native map scale which is the geo-locational distance each pixel represents on the Earth's surface. The geo-locational distance may be expressed in various mapping units including, but not limited to, latitudinal degrees per pixel for one map dimension and longitudinal degrees per pixel for another map dimension.

In the same or different embodiment, systems and techniques display a zoom bar vertically on a screen of a device (i.e., from the top of the device to the bottom of the device). The zoom bar is configured to receive user input, such as user pinching and/or thumbing displayed map scale marks on a touch screen. Such hand/finger gestures serve to move the displayed zoom bar (or a portion thereof) up and down vertically (or left to right horizontally, although other embodiments are possible involving various orientation offset from the vertical and horizontal) while another portion of the displayed zoom bar having an arrow representative of a current map display scale remains in a fixed position on the display screen. If certain map scale marks pass the fixed arrow, then the map scale will change (i.e. the scale of the map being displayed will change). In between the scale hash marks, the map data remains at the same scale, but pixels that combine to form the map data are affine transformed relative to the rendered geographic map. In other words, map image pixels may be enlarged and/or reduced depending on the received input resulting in associated enlargements or reductions of the map image in a map view. The overall effect is to present a continuous zooming experience to a user and to enable enhanced understanding and control of the map.

The use of the zoom bar to control map zooming can reduce the interface complexity by decreasing and/or eliminating the need for a user to manually choose between data sets and the scale associated with a selected data set. This approach also gives a user an enhanced understand of how the map scales tie together geographically. The act of moving the zoom bar simultaneously sets both the map scale and the pixel to pixel orientation (e.g., the zooming-in and/or zooming-out) of map data at the map scale.

The zoom bar provides an arrow indicator along with the map scale hash marks to indicate to the user the current map display scale, which is important if the user needs to view and use map information at a particular map scale for operational and inquisitive purposes. Also, a user need not choose a map scale based upon a "title" and/or map legend. Rather, the zoom bar provides the user with a comprehensive sense as to how map scales compare with one another based upon relative map scale positioning along the zoom bar.

Advanced systems such as military systems are in continuous search of systems and methods to ease the burden of a soldier on a battlefield by providing information the soldier needs in the most rapid, comprehensive format. The zoom bar apparatus described herein enables a continuous zoom capability for mapping applications in a way that is relatively easy for a map user to conceptualize and rapidly control to get at needed or desired map information.

It should be appreciated, however, that the systems and techniques described herein are not limited to use in military systems. As by way of non-limiting examples, the systems and techniques may be used in a vehicle tracking system to support business services, or in a data-mining system to study the spread of an infectious disease across a population.

In one aspect, an apparatus for map zooming includes instructions stored in a memory that when executed by a processor render a zoom bar. The zoom bar includes map scale hash marks arranged along an axis of the zoom bar and indicative of a map scale range of a geographic map. The map scale hash marks include a first map scale hash mark representative of a first map scale, a second map scale hash mark offset along the zoom bar axis from the first map scale hash mark and representative of a second map scale, and a map transformation hash mark located between the first and second map scale hash marks and representative of a transformation of the geographic map from a first map data set defined with reference to the first map scale to a second map data set defined with reference to the second map scale. The zoom bar further includes a map zoom bar indicator located relative to the first and second map scale hash marks and corresponding to a current map display scale and a zoom level of the geographic map.

In further embodiments, the zoom bar apparatus includes one or more of the following features: the current map display scale corresponds to predetermined relationships of the locations of the map zoom bar indicator, at least one of the map scale hash marks, and the map transformation hash mark; a movable portion of the zoom bar includes the map scale hash marks and the map transformation hash mark, and another fixed portion of the zoom bar includes the map zoom bar indicator; the movable portion of the zoom bar moves in a direction parallel to the zoom bar axis; at least one of the map scale hash marks includes a map scale hash mark line oriented in a direction orthogonal to the direction of the zoom bar movement; the map transformation hash mark includes a line parallel to the at least one map scale hash mark line and having a length greater than the length of the at least one map scale hash mark line; the map transformation hash mark is located midway between the first and second map scale hash marks; the geographic map includes the first map data set when the map zoom bar indicator is located on one side of the map transformation hash mark along the zoom bar axis and the geographic map includes the second map data set when the map zoom bar indicator is located on the other side of the map transformation hash mark opposing the one side; the map transformation hash mark is representative of the zoom level of the current map display scale according to $A+(B-A)/2$ where A is the value of the second map scale and B is the value of the first map scale; the first map data set includes a first map imagery transformed by a ratio of first map imagery pixels to pixels of a screen displaying the first map imagery, the ratio equal to a first value when the map zoom bar indicator is proximate to the first map scale hash mark, a second value less than the first value when the map zoom bar indicator is located on one side of the first map scale hash mark along the zoom bar axis representative of map scales greater than the first map scale, and a third value greater than the first value when the map zoom bar indicator is located on the other side of the first map scale hash mark representative of map scales less than the first map scale; the map zoom bar indicator includes an icon having a point located proximate to the plurality of map scale hash marks at a location indicative of the current map display scale, and; the zoom level of the current map display scale corresponds to a first predetermined relationship when the map zoom bar indicator is located between the first map scale hash mark and the map transformation hash mark, and the zoom level of the current map display scale corresponds to a second predetermined relationship when the map zoom bar indicator is located between the second map scale hash mark and the map transformation hash mark; the first predetermined relationship corresponds to a ratio of the distance between the map zoom bar indicator and one of the first map scale hash mark or the map transformation hash mark and the overall distance between the first map scale hash mark and the map transformation hash mark, and the second predetermined relationship corresponds to a ratio of the distance between the map zoom bar indicator and one of the second map scale hash mark or the map transformation hash mark and the overall distance between the second map scale hash mark and the map transformation hash mark.

In one aspect, a machine-based method for map zooming includes representing a map scale range of a geographic map using a rendered zoom bar including map scale hash marks, a map transformation hash mark located between at least two of the map scale hash marks along an axis of the zoom bar, and a map zoom bar indicator, and representing a current map scale and a zoom level of the geographic map using the map zoom bar indicator. The method further includes, in a processor, controlling transformation of map data sets of the geographic map from at least a first map data set to a second map data set based upon a location of the map zoom bar indicator relative to the map transformation hash mark, and defining the current map display scale and the zoom level of the current map display scale based upon predetermined relationships of locations of the map zoom bar indicator, the map scale hash marks, and the map transformation hash mark.

In further embodiments, the machine-based method includes one or more of the following features: said representing of the map scale range further includes providing the map scale hash marks as lines oriented in a direction orthogonal to the axis of the zoom bar; the map transformation hash mark includes a line parallel to the map scale hash mark lines, the map transformation hash mark line located midway between a first one of the map scale hash mark lines and a second one of the map scale hash mark lines and having a length that is larger than the length of the first or second one of the map scale hash mark lines; said controlling transformation of map data sets is based upon a map transformation scale according to A+(B−A)/2 where A corresponds to a scale of the second map data set and B corresponds to a scale of the first map data set; the first map data set includes a first map imagery when the map zoom bar indicator is located on a first side of the map transformation hash mark along the zoom bar axis and includes a second map data set when the map zoom bar indicator is located on a second side of the map transformation hash mark opposing the first side; said controlling transformation of map data sets further includes controlling transformation of the first map imagery according to a ratio of first map imagery pixels to pixels of a screen displaying the first map imagery, the ratio equal to a first value when the map zoom bar indicator is proximate to a first one of the map scale hash marks, a second value less than the first value when the map zoom bar indicator is located on one side of the first one of the map scale hash marks, and a third value greater than the first value when the map zoom bar indicator is located on the other side of the first one of the map scale hash marks; further including controlling the current map display scale and the zoom level by moving a portion of the zoom bar including the map scale hash marks and the map transformation hash mark relative to a fixed portion of the zoom bar including the map zoom bar indicator; said controlling transformation further includes sliding the movable portion of the zoom bar in a direction parallel to the zoom bar axis; said defining the zoom level of the current map display scale is based upon a first predetermined relationship when the map zoom bar indicator is located between a first one of the map scale hash marks and the map transformation hash mark, and a second predetermined relationship when the map zoom bar indicator is located between a second one of the map scale hash marks and the map transformation hash mark, and; the first predetermined relationship corresponds to a ratio of the distance between the map zoom bar indicator and the first one of the map scale hash marks or the map transformation hash mark and the overall distance between the first one of the map scale hash marks and the map transformation hash mark, and the second predetermined relationship corresponds to a ratio of the distance between the map zoom bar indicator and the second one of the map scale hash marks or the map transformation hash mark and the overall distance between the second one of the map scale hash mark and the map transformation hash mark.

In one aspect, a method of map zooming includes, in a processor, dividing a height of a zoom bar by a number of map data sets of a geographic map to obtain a height of a map data set, obtaining a current map data set being displayed in a geographic map and a latitude degrees per pixel value of the current map data set, determining an index of the current map data set and a midpoint hash mark position representative of a scale of the current map data set, obtaining a map data set pixels per display pixel value corresponding to a ratio of the current map data set pixels over the display pixels, determining a current map display scale factor based upon the map data set pixels per display pixel value and the latitude degrees per pixel value of the current map data set, determining an upper transition latitude per pixel hash mark position and a lower transition latitude per pixel hash mark position representative of a display range of the current map data set, calculating a percentage distance value from the midpoint hash mark position to one of the upper transition latitude per pixel hash mark position or lower transition latitude per pixel hash mark position based upon the map data set pixels per display pixel value, and calculating a zoom bar indicator position representative of the current map display scale.

In further embodiments, the method includes one or more following features: rendering the zoom bar having an axis in a major dimension centered at the zoom bar position, and arranging along the zoom bar axis a midpoint hash mark located at the midpoint hash mark position, a upper transition latitude per pixel hash mark at the upper transition latitude per pixel hash mark position, and a the lower transition latitude per pixel hash mark at the lower transition latitude per pixel hash mark position; in response to an input event, updating the zoom bar position by updating the midpoint hash mark position, the upper transition latitude per pixel hash mark position, and the lower transition latitude per pixel hash mark position, determining an updated current map data set based upon the updated zoom bar position, calculating a percent fixed position value based upon a relationship of the zoom bar indicator position and the upper transition latitude per pixel hash mark position when the zoom bar position is greater than the midpoint hash mark position, or a relationship of the zoom bar indicator position and the lower transition latitude per pixel hash mark position when the zoom bar position is less than the midpoint hash mark position and, calculating the current map display scale factor based upon the percent fixed position value; the input event corresponds to an interactive movement of a portion of the rendered zoom bar including the midpoint hash mark, the upper transition latitude per pixel hash mark, and the lower transition latitude per pixel hash mark; another portion of the rendered zoom bar including the zoom bar indicator is fixed, and; further including outputting the current map data set and the current map display factor to enable rendering of the geometric map.

It should be appreciated that in accordance with the concepts and techniques described herein, a display pixel can represent a fractional number (i.e. a non-integer number) of map pixels and vice versa. For example, one display pixel could equal 1.3 map pixels or one display pixel could equal 0.3 map pixels. Enabling display pixels to represent both an integer number and a non-integer number (i.e. a fractional number) of map pixels and vice versa allows continuous zoom to be achieved. Such fractional pixel rendering can be achieved, for example, through the use of an affine transformation (i.e. a linear interpolation which selects pixels based upon a slope value). Thus, one display pixel may correspond to an integer number of map pixels (e.g. 2 map pixels) or one display pixel may correspond to a non-integer number of map pixels (e.g. 2.2 map pixels). Similarly, one map pixel may correspond to an integer number of display pixels (e.g. 2 display pixels) or one map pixel may correspond to a non-integer number of display pixels (e.g. 2.2 display pixels). Accordingly, it should be appreciated that the map display system and techniques described herein are more flexible than just two time (2×) zoom stepping levels.

It should be appreciated thus that although examples described herein illustrate integer multiples of map and display pixels (and in particular integer multiples of a 2:1 scaling), such examples are merely used to promote clarity and understanding in the drawings and the text with respect to the general concept being describe. It should be appreciated that the system and techniques described herein are not in any way limited to the use of integer multiples, rather the use of any fractional relationship required to provide continuous zoom may be used.

BRIEF DESCRIPTION OF THE DRAWINGS

The foregoing features of concepts, system, and techniques described herein may be more fully understood from the following description of the drawings in which:

FIG. 8B is a flow diagram of a further embodiment of the map zooming method of FIG. 8A, and;

DETAILED DESCRIPTION

Before departing on a detailed description of embodiments of the inventive concepts, systems, and techniques described herein, it may be helpful to review certain mapping concepts related to map scale. Map scale generally refers to a ratio of a distance on a map (e.g., a distance between two cities represented on the map) to a corresponding real-world distance on the Earth's surface (i.e., the actual distance between the two cities on the Earth). For example, a map scale of 1:500 indicates that an arbitrary single unit of distance on a map is equivalent to 500 similar units of distance on the ground. If the map is defined in feet, for example, then the map scale 1:500 (which may be expressed in other ways such as 1/500) indicates that every map-foot represents 500 feet on the ground. Map scale may also be expressed as 1 inch equals 500 feet (i.e. different distance units) in which case 1 inch on the map corresponds to 500 feet of actual distance). Thus, if two locations on the map are separated by a distance of 1 inch then the actual distance between the two locations would be 500 feet. Paper maps (e.g., road maps) are defined at a particular static map scale (i.e., the map scale cannot be changed without completely reprinting the paper copy), typically indicated somewhere on the face of the map. With the onset of digital mapping and graphical computing, electronic maps (e.g. maps displayed or rendered on a computerized display screen) can be viewed at different map scales relatively quickly.

Map scale is indicative of a level of detail displayed on a map, which may vary over a map scale range for a given map. For example, a small map scale (e.g. 1 inch=500 miles) generally indicates that the map covers a large geographic area, such as the continental United States, and therefore the level of detail is relatively coarse. In contrast, a map defined at a large map scale (e.g. 1 inch=100 feet) generally indicates that the map covers and includes relatively small geographic features, such as a town's streets, and points of interest, etc., and therefore the level of detail is considered to be relatively fine. As is apparent to one of ordinary skill in the art, map scale selection may be based upon the type of information that is required or desired.

For example, map users need a relatively large map scale to view small features on the ground, such as a building, and a relatively small map scale to view larger features, such as the paths of interstate commercial routes. Furthermore, because map data is typically defined (or created) at a particular map scale, the map data may have limited effectiveness in providing the information outside a certain scale range.

Figure 1:
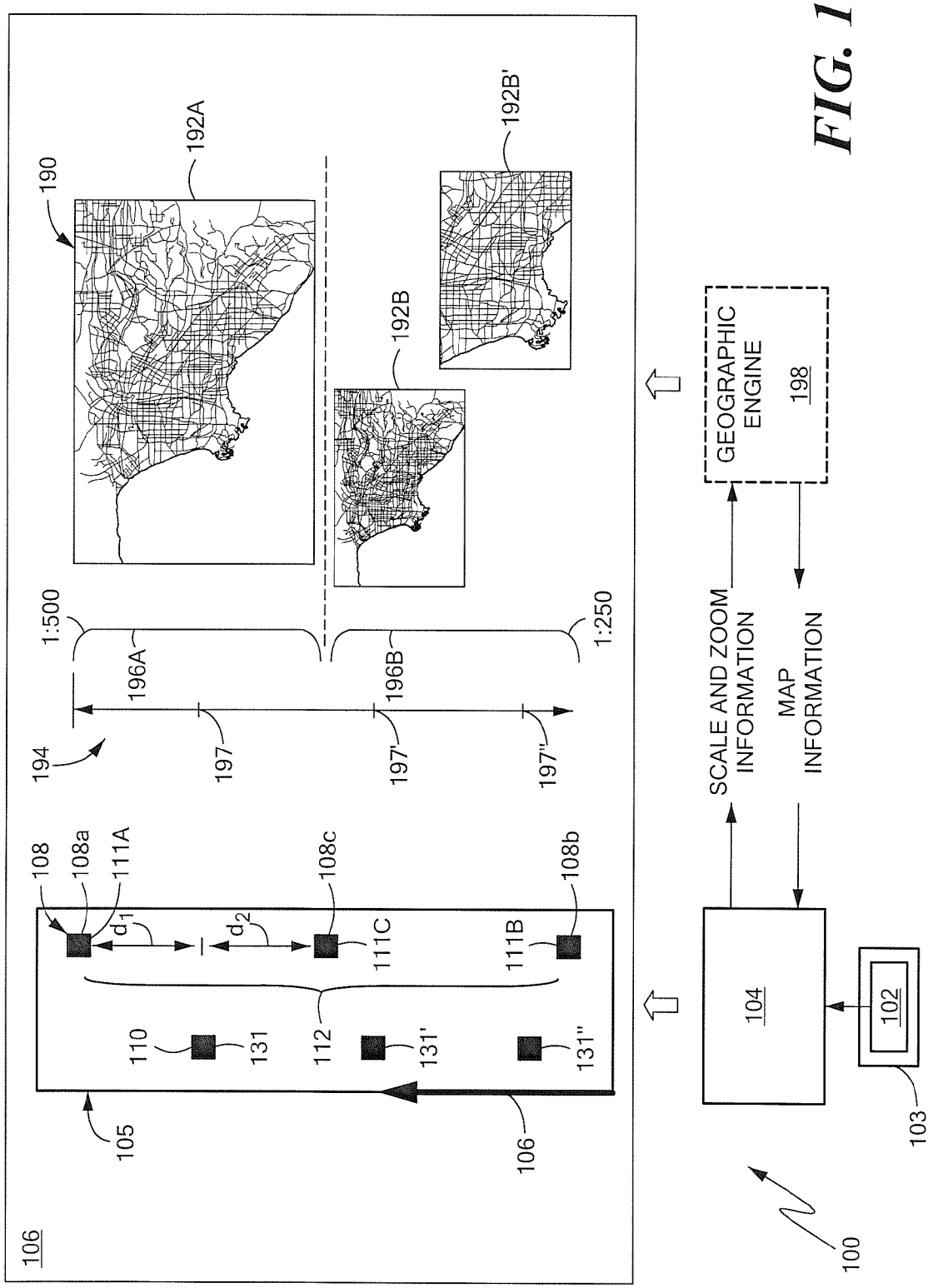
FIG. 1 is a diagram of an embodiment of a zoom bar apparatus according to the systems and techniques described herein.

Referring now to FIG. 1, in one aspect, an apparatus 100 for map viewing and zooming includes instructions 102 stored in a memory 103 that when executed by a processor 104 render a zoom bar 105. The zoom bar 105 is provided having a zoom bar axis 106. In the exemplary embodiment of FIG. 1, zoom bar axis 106 is shown as a vertical axis within display 103. It should be appreciated, however, that in some embodiments it may be desirable or even necessary to provide zoom bar axis 106 as a horizontal axis within display 103. A plurality of map scale hash marks here three map scale hash marks 108a, 108b, 108c (generally denoted by reference numeral 108) (hereinafter sometimes referred to as the "map transformation hash mark") are generally arranged along zoom bar axis 106. Zoom bar 105 further includes a map zoom bar indicator 110.

The first map scale hash mark 108a is rendered at a first location 111a along zoom bar axis 106 and is representative of a first map scale 196A of the geographic map 190, and the second map scale hash mark 108b is rendered at a second location 111b along the zoom bar axis 106 and is representative of a second map scale 196B of the geographic map 190. As can be seen in FIG. 1, the second location 111b (of the second map scale hash mark 108b) is offset by a distance denoted as 112 from the first location 111a (of the first map scale hash mark 108a).

The map transformation hash mark 108c is rendered at third location 111c between the first and second locations 111a, 111b. The map transformation hash mark 108c is representative of a transformation of a first geographic map 190 from one map data set to another map data set. In one embodiment, the transformation is from a first map imagery 192A defined with reference to a first map scale 196A to a second map imagery 192B defined with reference to a second map scale 196B.

Map zoom bar indicator 110 is rendered at a location 131 along zoom bar axis 106 in proximity to the map scale hash marks 108 and is indicative of a current map display scale and a zoom level of the geographic map 190. In FIG. 1, the map zoom bar indicator 110 is located between first map scale hash mark 108a and map transformation hash mark 108c. At such a location 110, the map zoom bar indicator 130 is indicative of a map scale 196A (e.g., 1:500) at which map imagery 192A is rendered on the geographic map 190 (i.e. map imagery 102a is rendered on at least a portion of display 103 at a scale of 1:500).

A zoom level represents a zoomed in or a zoomed out view of map data defined at a particular map scale. In other words, map data defined at a certain map scale may be further zoomed-in (to increase viewed detail) and/or further zoomed-out (to decrease viewed detail). In FIG. 1, for example, hash mark 197 represents a zoom level corresponding to a zoomed in view of map imagery 192 because at such a location 131, the map scale is smaller than the map scale defined at first map scale hash mark 108a. Furthermore, respective zoom levels 197' and 197" represent zoomed in views of respective map imagery 192B and 192B'. As can be seen in FIG. 1, zoom levels 197', 197" correspond to the map zoom bar indicator 130 at alternative locations 131', 131" along the zoom bar axis 103.

In a further embodiment, a zoom level of a map (and, in particular, a zoom level of map imagery displayed on the map) corresponds to a relationship of the distance of a map zoom bar indicator to a first map scale hash mark and the distance of the map zoom bar indicator to a map transformation hash mark. For example, in FIG. 1, zoom level 197 of map imagery 192A corresponds to a relationship of the distance $d_1$ of map zoom bar indicator 110 to first map scale hash mark 108a and the distance $d_2$ of map zoom bar indicator 110 to map transformation hash mark 108c. As described above, the map transformation hash mark 108c corresponds to a location along the zoom bar axis 103 at which the map transforms from first map imagery 192A to second map imagery 192B.

In some embodiments, map imagery pixels are characterized by a geo-locational distance that each pixel represents (which may be expressed as the geo-locational distance per pixel). The geo-locational distance per pixel may be expressed in two dimensions (i.e. a vertical dimension and a horizontal dimension of a map) as a latitude degrees per pixel and a longitude degrees per pixel. Taking the latitude dimension as an example, in FIG. 1, first map scale 196A represents 1:500 decimal latitude degrees per pixel and second map scale 196B represents 1:250 decimal latitude degrees per pixel. With such an arrangement, map sale hash mark 108a represents map imagery 192 rendered at 1:500 map scale and map scale hash mark 108b represents map imagery 192B rendered at 1:250 map scale.

In a further embodiment, in order to achieve a smooth scale transition between a first map data set (i.e. first map imagery 192A) and a second map data set (i.e. second map imagery 192B), the map transformation hash mark 108c can be defined to correspond to a map transformation scale $S_T$ midway between first and second map scales 196A, 196B, according to equation 1:

$$S_T=(S_1+S_2)/2. \tag{1}$$

Here, $S_1$ equals the first map scale and $S_2$ equals the second map scale. In FIG. 1, where $S_1$ equals 1:500, or 500 (i.e. the number to the right of the colon) and $S_2$ equals 1:250, or 250, $S_T$ will equal 1:375 decimal latitude degrees per pixel. Once $S_T$ is determined, the zoom level Z of the map can be calculated using the above distances $d_1$ and $d_2$ according to equation 2:

$$Z=S_T+(d_2/(d_1+d_2))*(S_1-S_T). \tag{2}$$

Distances $d_1$ and $d_2$ may be defined in pixel coordinates or in a zoom bar coordinate system. For example, if $d_1$ and $d_2$ are each equal to 50 units in zoom bar coordinates (and given $S_1$ and $S_T$ above), then Z is equal to 1:437.5 decimal latitude degrees per pixel.

In the same or different embodiment, distances $d_1$ and $d_2$ are expressed as percentages representing relative distances between surrounding hash marks. In FIG. 1, for example, where the map zoom bar indicator 130 is located midway between the hash marks 108a and 108c at location 131, $d_1$ and $d_2$ each equal 50% of the overall distance between the hash marks 108a, 108c.

In a further embodiment, apparatus for map viewing and zooming 100 provides on display 106 information including, but not limited to, a current map display scale and a zoom level. A mapping program, such as a geographic mapping engine 198 (shown in phantom since the mapping engine 198 and rendered map 190 are not properly part of the zoom bar apparatus 100), may receive and use the information to control (e.g., scale and/or zoom) a viewed map and/or transform the map from a first map data set (e.g., map imagery 192) to a second map data set (e.g. map imagery 192). In the same or different embodiment, the apparatus for map viewing and zooming 100 receives an output of a geographic mapping engine 198, which may include, but is not limited to, a description of map data sets (e.g., a description of map imagery defined a different map scales, a map scale range, etc.) used in the map 190. Apparatus 100 may use such information to define and/or redisplay the zoom bar 105, for example, in response to a user command to initialize and/or reset the map. Such interactions and operation will be described further herein below.

It should be appreciated by one of ordinary skill in the art that although zoombar 105 is here shown having three map scale hash marks 108a, 108b, and 108c to represent a map scale range and a map data transformation in a geographic map 190 zoom bar 105 may include a smaller or larger number of map scale has marks. For example, as will be described herein below, a zoom bar may include more than two map scale hash marks. For example, three, four, five, ten, 20, 100, 1000, etc. map scale hash marks may be used.

It should also be appreciated that although reference is made herein to geographic mapping and in particular to geographic map scaling and zooming, the systems and techniques described herein should not be construed as limited to geographic mapping. As by way of non-limiting examples, the systems and techniques may be used to control views of charts and graphs that may incorporate information at various scales (i.e., levels of detail) and that would benefit by continuous scaling/zooming as described herein. Such example charts and graphs may include target-tracking scatter plots (e.g. to track enemy aircraft), stock trading time-series graphs (e.g. to monitor stock value over time), multi-level data hierarchies (e.g. detailed organization charts, ontological data, etc.), and/or building floor plan (e.g. in a facilities management application).

Figure 2:
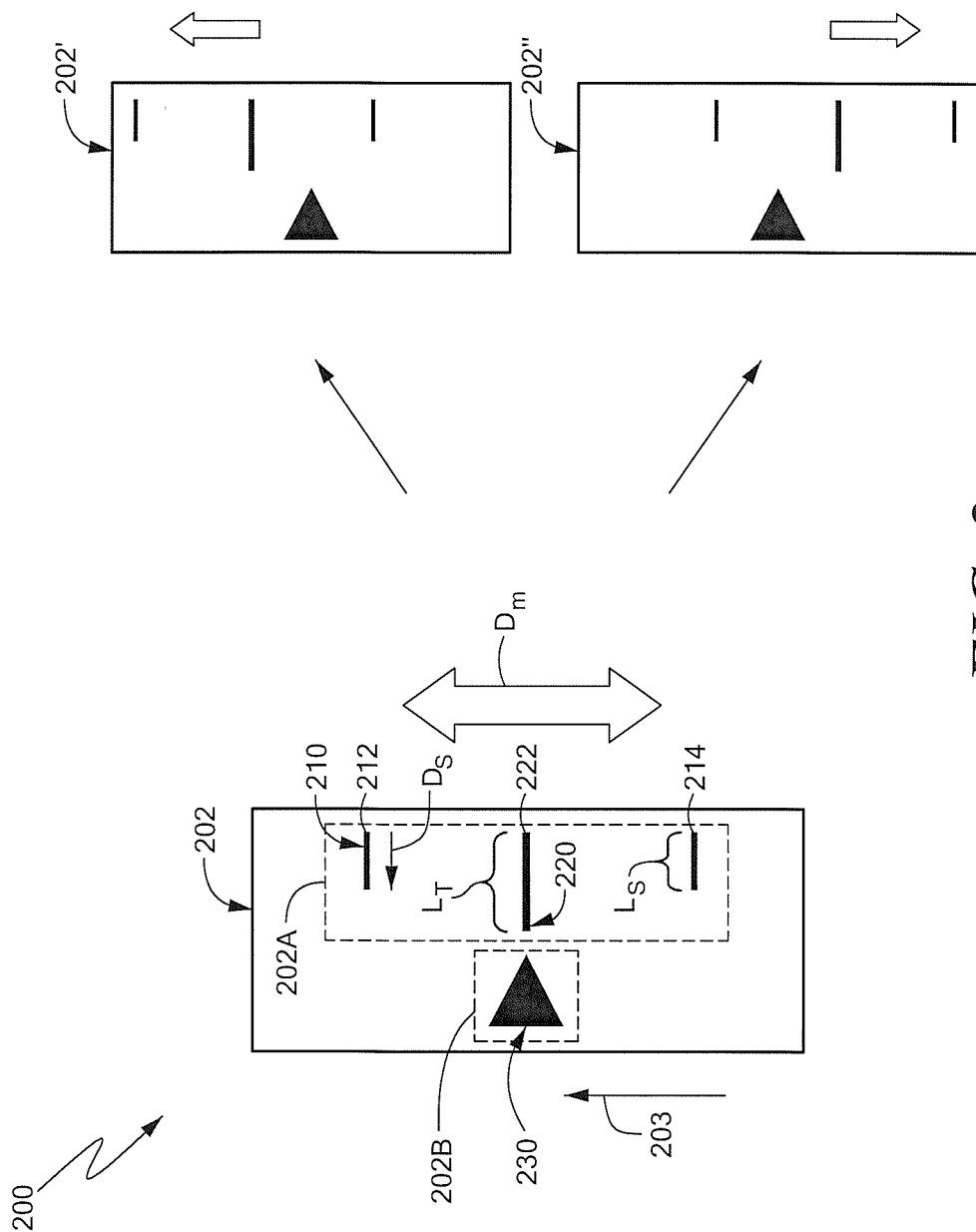
FIG. 2 is a pictorial representation of a more detailed embodiment of the zoom bar of FIG. 1 with non-limiting examples of zoom bar movements.

Referring now to FIG. 2, in a further embodiment rendered on a display 200 is a zoom bar 202 having a movable portion 202 including map scale hash marks (generally designated by reference numeral 210) and a fixed portion 202, including a map zoom bar indicator 230. In a further embodiment, the movable portion 202 of the zoom bar 202 moves in a direction $D_M$ parallel to a zoom bar axis 203. More particularly, movable portion 202 can move up, resulting in zoom bar 202', and/or down, resulting in zoom bar 202". Furthermore, direction $D_M$ may be aligned with a major axis of a device as described herein below with reference to FIG. 2A.

In a further embodiment, map scale hash marks 210 of zoom bar 202 include map scale lines 212, 214, 222 are oriented in a direction $D_S$ orthogonal to a movement direction $D_M$ of the zoom bar 202. In a further embodiment, a map transformation hash mark 220 includes a line 222 parallel to the map scale lines 212. In still a further embodiment, the map transformation line 222 has a length $L_T$ that is longer than a length $L_S$ (shown with reference to map scale line 214). In such a configuration, a user can more readily recognize map data set transformation points of the displayed map along the zoom bar 202, as will be described herein below.

It should be apparent to one of ordinary skill in the art that other methods may be used to emphasize the map transformation hash mark including, but not limited to, line thickness and/or line color.

In the same or different embodiment, the map transformation line 222 is located midway (i.e., half the distance) between a first map scale line 212 and a second map scale line 214. In such a configuration, a user can control map zooming in a way that responds smoothly and continuously to zoom bar movements. Such response may be linear (i.e. relative movements of the zoom bar result in the same degree of scale change) or non-linear (i.e. certain movements along the zoom bar modify the scale more rapidly than others), or a combination thereof. Furthermore, the zoom bar 202 can be configured to seamlessly transform from a first map data set (as may be similar to map imagery 192A described in conjunction with FIG. 1) to a second map data set (as may be similar to map imagery 192B described in conjunction with FIG. 1) when the fixed map zoom bar indicator 230 passes by the map transformation line 222. In other words, although the map scale changes as zoom bar movement occurs, scale change between the first and second map data sets at map transformation line 222 may appear to be at continuous.

Figure 2A:
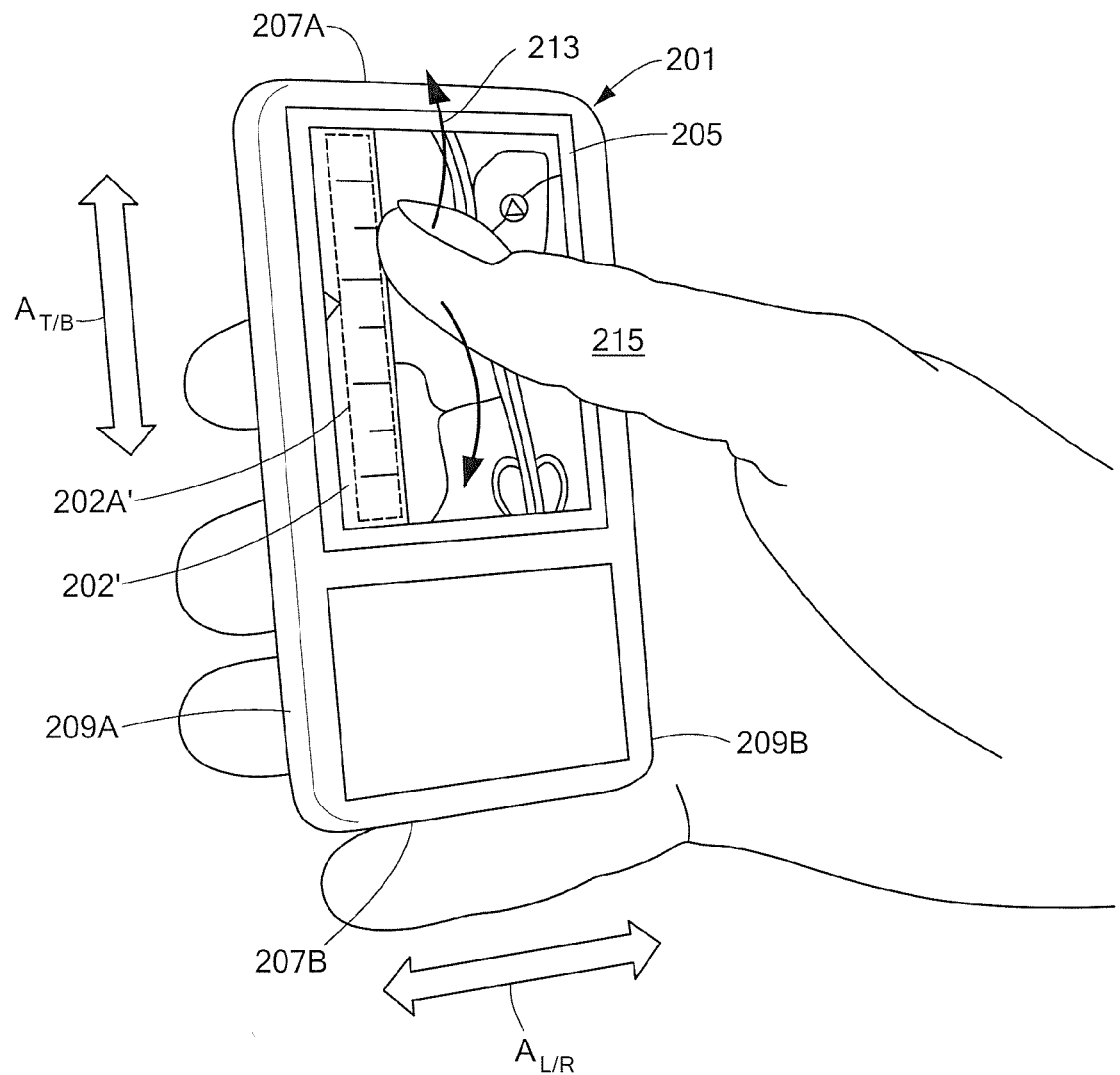
FIG. 2A is a pictorial representation of an embodiment of a zoom bar displayed on a screen of a hand-held device.

Referring now to FIG. 2A showing a zoom bar embodiment 202' similar to that shown in FIG. 2 and rendered on a display 205 of an exemplary hand-held device 201, a movable portion 202A' of the zoom bar 202' moves in a direction generally parallel to a major axis $A_{T/B}$ of the device 201. For example, device 201 can be said to have a top side 207A and a bottom side 207B that define an extent and orientation of major axis $A_{T/B}$ of the device 201. The device 201 also has a left side 209A and a right side 209B that define an extent and an orientation of another major axis $A_{L/R}$ of the device 201. Generally speaking, the major axis $A_{T/B}$ can be said to be aligned with the vertical (i.e., up/down) and the major axis $A_{L/R}$ can be said to aligned with the horizontal (i.e., left/right). It will apparent to one of ordinary skill in the art that the movable portion 202A' may be configured to move in different directions depending on a number of design considerations, such as whether the device has a portrait-like footprint or landscape-like footprint. Furthermore, the movable portion 202A' may be configured to respond to received user input, such as up-and-down movements 213 of the user's thumb 215 across a touch-enabled display screen 205.

Figure 3A:
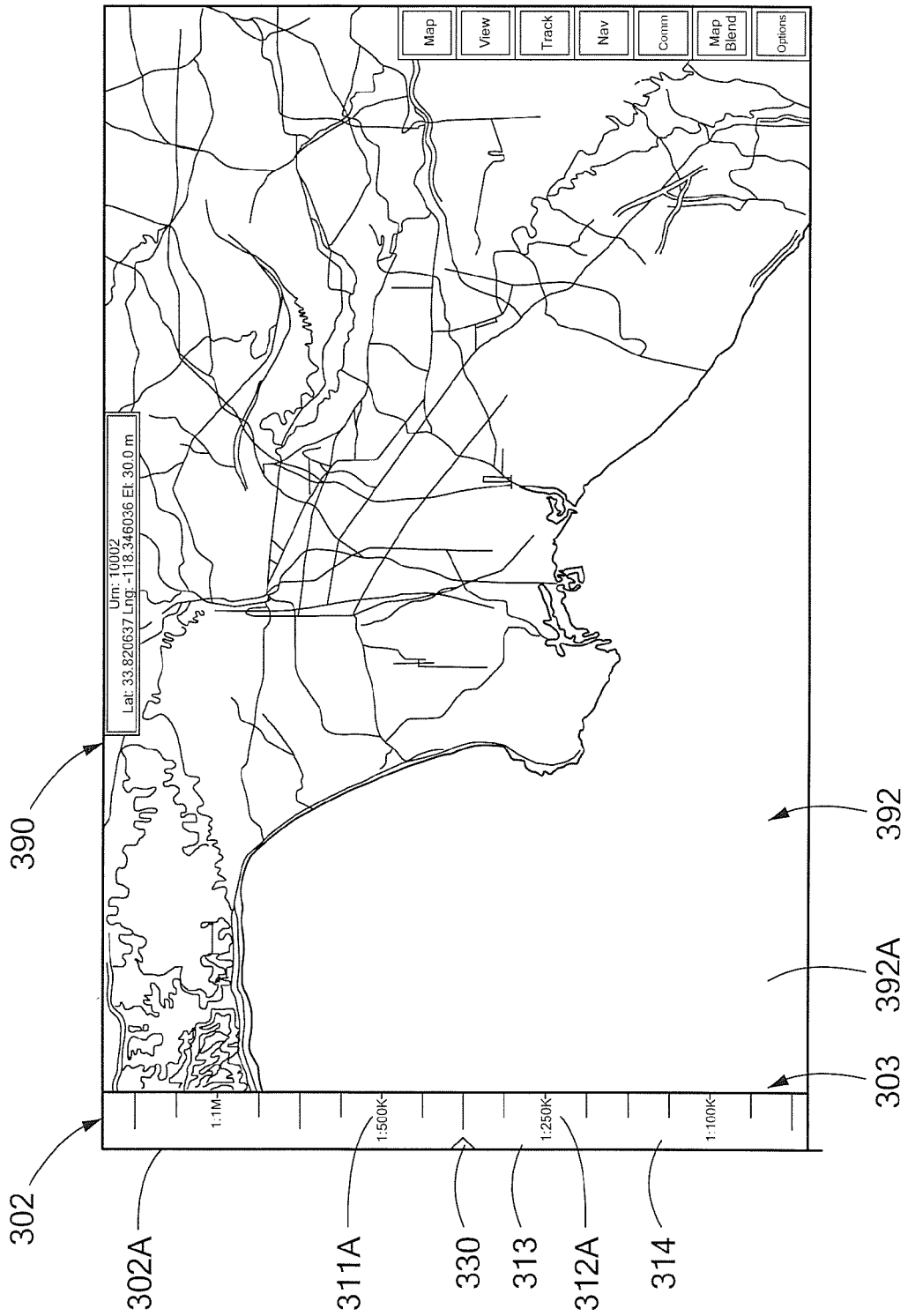
FIG. 3A is a pictorial representation of zoom bar to control map scaling and zooming and map imagery transformation in a map.
Figure 3B:
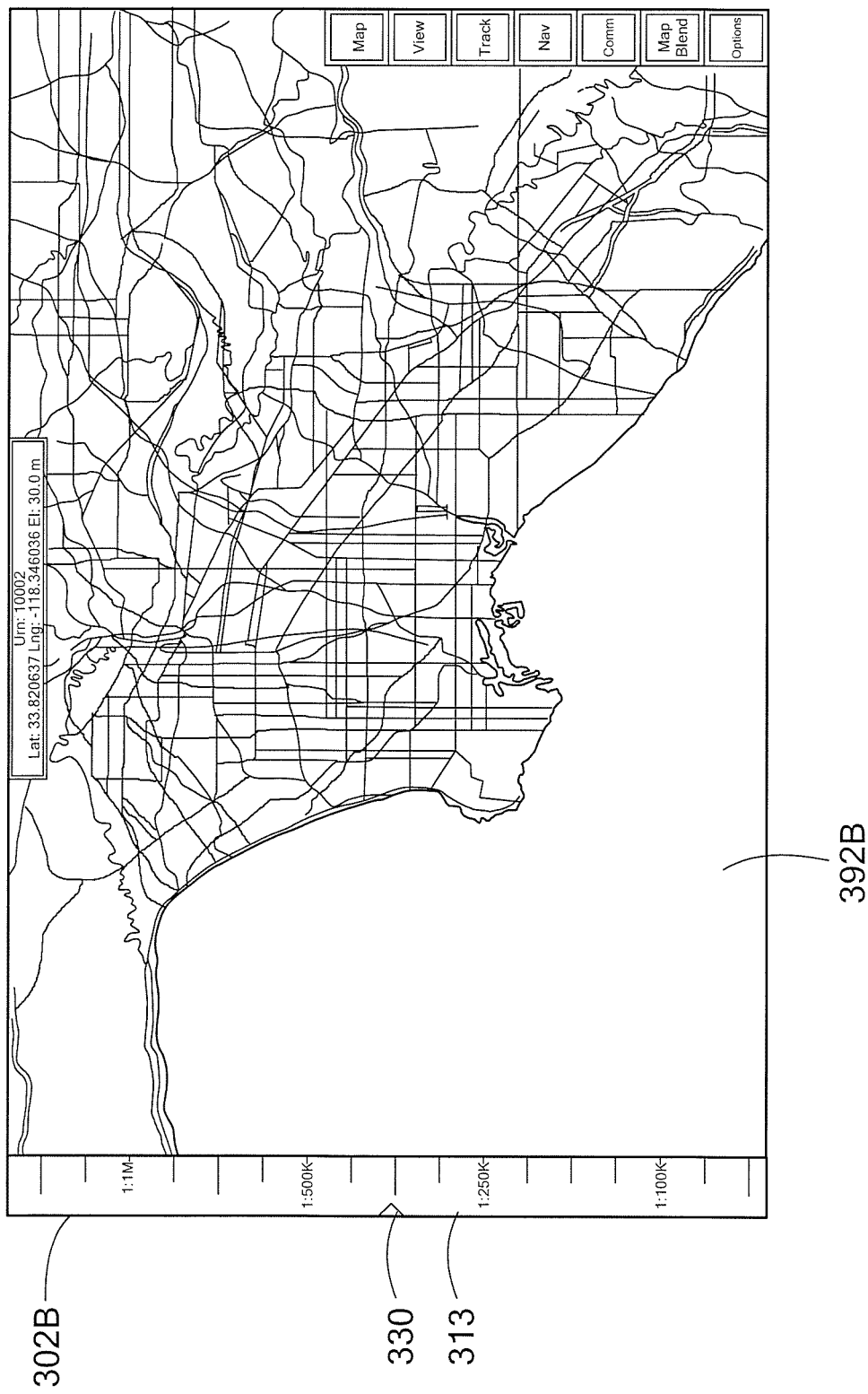
FIG. 3B is a pictorial representation of another view of the zoom bar of FIG. 3A.
Figure 3C:
FIG. 3C is a pictorial representation of yet another view of the zoom bar of FIG. 3A.

Non-limiting examples of rendered zoom bars (generally designated by reference numeral 302 and as may be similar to zoom bar 202 described in conjunction with FIG. 2) are respectively shown in FIGS. 3A, 3B, and 3C, in which like elements of the figures are shown with like reference numerals. Such zoom bars 302 control map scaling and zooming of map data set imagery 392A, 392B, 392C (generally designated by reference numeral 392) displayed in a map 390. The map 390 may be rendered by a geographic mapping engine (as may be similar to geographic mapping engine 198 described in conjunction with FIG. 1).

Referring now to FIG. 3A, in a first view of the zoom bar 302A, a map zoom bar indicator 330 is located proximate to a map transformation hash mark 313 along the zoom bar axis 303. The map transformation hash mark 313 is located midway between a first map scale hash mark 311A representative of map scale 1:500 and a second map scale hash mark 312A representative of map scale 1:250. More precisely, the map zoom bar indicator 330 is located just above the map transformation hash mark 313 which corresponds to a current map display scale of 1:500 and at which a zoomed-in view of map imagery 392A is rendered on the map 390.

As can be seen in FIG. 3A, the map scale hash mark 311A, 312A are labeled with map scale legends to enhance usability/readability of the zoom bar 302. Other map scale hash marks (generally designated by reference numeral 314) may also appear on the zoom bar 302 which serve to further enhance usability/readability of the zoom bar 302 (i.e., by dividing the zoom bar 302 into visually recognizable, distinct regions).

Referring now to FIG. 3B, in a second view of the zoom bar 302B, the map zoom bar indicator 330 is located proximate map transformation hash mark 313 as in FIG. 3A, however, just below (instead of just above) the map transformation hash mark 313. This corresponds to a current map display scale of 1:250 at which a zoomed-out view of map imagery 392B is rendered on the map 390. In one embodiment, such a shift in map scale is accomplished by moving a portion of the zoom bar up, while the map zoom bar indicator 330 remains fixed (as may be similar to the upward zoom bar movement described in conjunction with zoom bar 202" of FIG. 2). Although, map imagery 392A and 392B represent different scales (i.e., a smaller scale and a larger scale), it can be seen that map imagery 392A and 392B are generally displayed at similar zoom levels proximate to map transformation hash mark 313. Thus, although the map 390 has transformed from one to another map imagery (i.e., from map imagery 392A in FIG. 3A to map imagery 392B in FIG. 3B), to a user the transformation appears to be seamless and continuous, although the user may notice the transformation if the maps have different content and feature detail.

Referring now to FIG. 3C, in a third view of the zoom bar 302O, the map zoom bar indicator 330 is proximate to map transformation hash mark 323, corresponding to a current map display scale of 1:250. As can be seen in FIG. 3C, map imagery 392C is a zoomed-in version of map imagery 392B shown in FIG. 3B. Accordingly, such zooming-in expands map content (and the features shown thereon). Such a change from the zoom level of FIG. 3B to the zoom level of FIG. 3C may be achieved by an upward movement of the zoom bar 302C from just below map transformation hash mark 313 to just above map transformation hash mark 323 in FIG. 3C.

Figure 4:
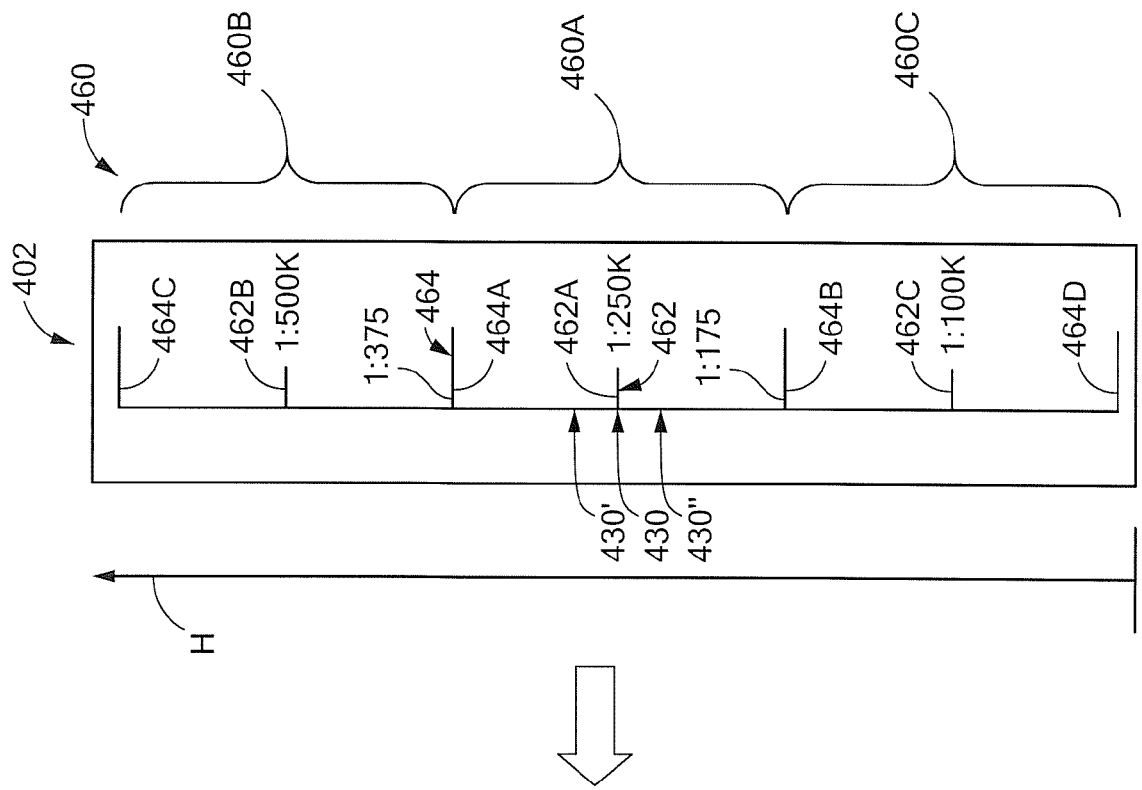
FIG. 4 is a pictorial representation of a zoom bar including map data set regions and with reference to a zoom bar coordinate system.
Figure 4:
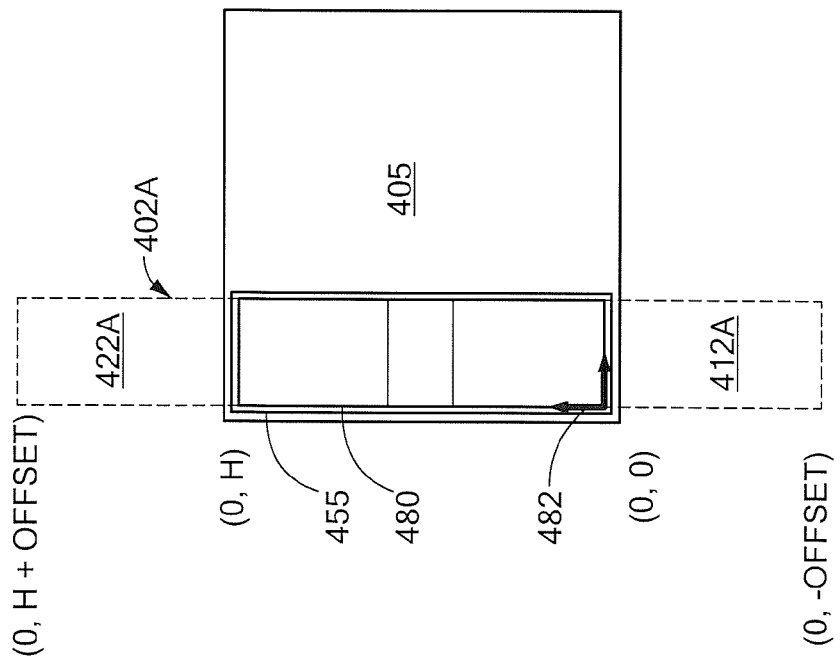

Referring now to FIG. 4, in a further embodiment, a zoom bar 402 includes map data set regions 460. Within each map data set region 460 is a midpoint hash mark 462 at which the map data set is displayed pixel to pixel with the rendered map image. In other words, there is a one-to-one relationship between a map data set pixel (i.e. a pixel of a map data set image) and a screen pixel. In this way, the map data set pixel can be said to fill/occupy a single screen pixel.

As an example, at midpoint hash mark 462A in map imagery region 460A, a map data set pixel corresponds to a screen pixel and the map image is displayed at map scale 1:250 (i.e., the native scale of the map image). Therefore, if a map zoom bar indicator 430 points to the midpoint hash mark 462A, then map imagery is displayed pixel-to-pixel to the display screen. In such a case, a screen pixel represents whatever geo-locational distance a map image pixel represents, as will be described herein below.

At other locations above and below a midpoint hash mark 462 of a map data set region 460, map data set pixels are either condensed or expanded with respect to screen pixels. In some embodiments, if the map zoom bar indicator 430' is above the midpoint hash mark 462A, then a map data set pixel is smaller than a screen pixel. In such an instance, a screen pixel represents multiple map data set pixels, resulting in a zoomed-out view of the map image. Alternatively, if the map zoom bar indicator 430" is below the midpoint hash mark 462A, then a map data set pixel is larger than a screen pixel and a map data set pixel is represented by multiple screen pixels.

It should be appreciated that a display pixel can represent a fractional number (i.e. a non-integer number) of map pixels and vice versa. For example, one display pixel could equal 1.3 map pixels or one display pixel could equal 0.3 map pixels. Enabling display pixels to represent both an integer number and a non-integer number (i.e. a fractional number) of map pixels and vice versa allows continuous zoom to be achieved.

Such fractional pixel rendering can be achieved, for example, through the use of an affine transformation (i.e. a linear interpolation which selects pixels based upon a slope value). It should be appreciated, of course, that other transformation techniques (e.g. texturing/filtering techniques) known to those of ordinary skill could also be used.

Thus, one display pixel may correspond to an integer number of map pixels (e.g. 2 map pixels) or one display pixel may correspond to a non-integer number of map pixels (e.g. 2.2 map pixels). Similarly, one map pixel may correspond to an integer number of display pixels (e.g. 2 display pixels) or one map pixel may correspond to a non-integer number of display pixels (e.g. 2.2 display pixels).

Accordingly, it should be appreciated that the map display system and techniques described herein are more flexible than just two time (2×) zoom stepping levels.

It should thus be appreciated that although the example described in conjunction with FIG. 5 below illustrates integer multiples of map and display pixels (and in particular integer multiples of a 2:1 scaling), such an example is merely used to promote clarity and understanding in the drawings and the text with respect to the general concept being described. As discussed above the system and techniques described herein are not in any way limited to the use of integer multiples, rather the use of any fractional relationship required to provide continuous zoom may be used.

In a further embodiment, a height H of the zoom bar 402 is divided equally between the map data set regions 460. In other words, each map data set region is given an equally sized portion of the zoom bar 402. In this embodiment, the map data set regions 460 are ordered from one end to an opposite end of the zoom bar 402 and such ordering may be relative to the latitudinal degrees per map imagery pixel that each map data set region represents. In particular, a map data set region 460C with the smallest latitudinal degrees per map imagery pixel may be placed at the bottom end of the zoom bar 402 and a map data set region 460B with the largest latitudinal degrees per map imagery pixel may be placed at the top end of the zoom bar 402, with intermediate regions (i.e., region 460A) placed between these regions in ascending order from the bottom end.

Referring again to FIG. 4, in some embodiments, the zoom bar 402 is represented graphically on a display screen 405 as a vertical image 480. Such a zoom bar 402 may be defined in zoom bar coordinates 482, which is a local coordinate system used to define and draw various displayed objects (e.g., hash marks, the map zoom bar indicator, text, etc.) at locations within the zoom bar image 480. In a further embodiment, a local origin (0, 0) (expressed in zoom bar coordinates) represents a bottom left-hand corner of the zoom bar 402 and coordinates (0, H) represent a top left-hand corner of the zoom bar 402.

In further embodiments, zoom bar coordinates (0, 0) and (0, H) are aligned with a window area 455 reserved for the zoom bar 402 on the screen 405. In still further embodiments, a portion of the zoom bar 402A may be moved (as may be similar to movable portion 202A described in conjunction with FIG. 2). As a result of such movement, a bottom portion 412A of the zoom bar 402 may extend beyond the window area 455 and, as a result, may be hidden from view. Here, the bottom portion 412A is defined at zoom bar coordinates (0, −OFFSET), where OFFSET represents the extent of the zoom bar beyond the window area 455. Similarly, a top portion 422A of the zoom bar 402 may extend beyond window area 455 and, as a result, may be hidden from view. The top portion 422A is defined at zoom bar coordinates (0, H+OFFSET) where, again, OFFSET represents the extent of the zoom bar beyond the window area 455.

In further embodiments in which it is desired to have a smooth transformation (or transition) between map data sets defined at different map scales, map transformation hash marks 464 are located at borders between the map data set regions 460. In these embodiments, a map transformation hash mark (e.g., map transformation hash mark 464A) represents a map scale that is an average of the map scales of the surrounding midpoint hash marks (e.g., midpoint hash marks 462A and 462B surrounding map transformation mark 464A). As described above, the midpoint hash marks define different map scales at which map data set imagery is displayed on the map. A map transformation hash mark scale $S_T$ can be determined using equation 3:

$$S_T = S_1 + (S_2 - S_1)/2. \quad (3)$$

Here, $S_1$ represents the map scale of the midpoint hash mark just below the map transformation hash mark and $S_2$ represents the map scale of the midpoint hash mark just above. For example, in FIG. 4, a map transformation hash mark scale $S_T$ for map transformation hash mark 464A can be computed using the above equation to arrive at a value of 1:375, where $S_1$ equals 1:250 and $S_2$ equals 1:500. Similarly, a map transformation hash mark scale $S_T$ for map transformation hash mark 464B can be computed as 1:175, where $S_1$ equals 1:100 and $S_2$ equals 1:250.

In some embodiments, a map scale for map transformation hash mark at the very top and/or at the very bottom of the zoom bar 402 may be computed using the following equations:

$$S_T = 2 * S_{BELOW} \quad (4A)$$

$$S_T = S_{ABOVE}/2 \quad (4B)$$

Here, $S_{BELOW}$ is the midpoint hash mark just below the topmost map transformation mark, and $S_{ABOVE}$ is the midpoint hash mark just above the lowermost map transformation mark. For example, in FIG. 4, a map transformation hash mark scale $S_T$ for map transformation hash mark 464C may be computed as 1:1000 using equation 4A (where $S_{BELOW}$ equals 1:500) and a map transformation hash mark scale $S_T$ for map transformation hash mark 464D may be computed as 1:50 using equation 4B (where $S_{ABOVE}$ equals 1:100).

Figure 5:
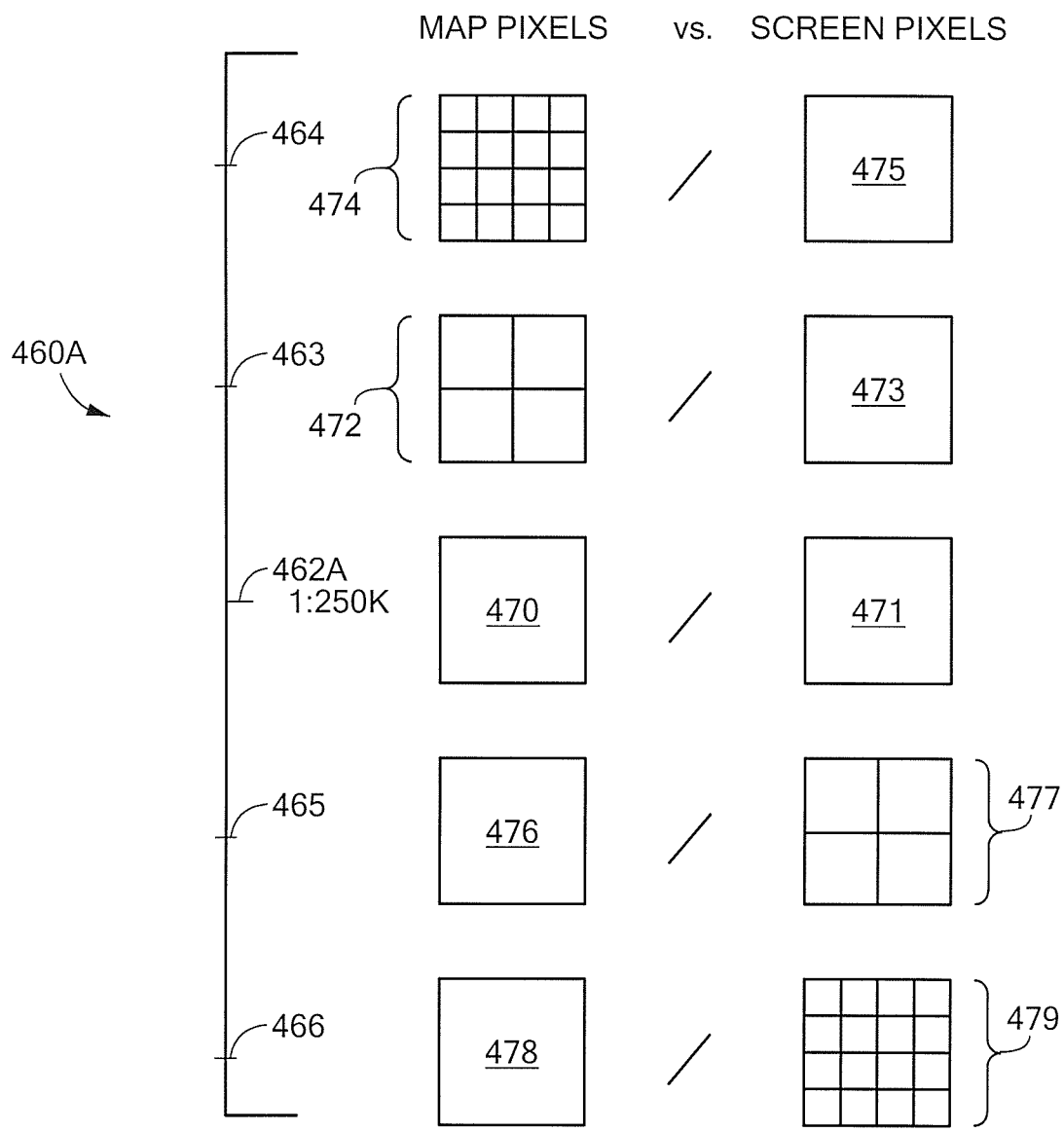
FIG. 5 is a pictorial representation of map pixel to screen pixel relationships at various points along a zoom bar.

Referring now to FIG. 5, to illustrate an embodiment of map imagery pixel zooming at various locations along a zoom bar, a close-up view of map imagery region 460A of FIG. 4 is shown side-by-side with map data set pixel vs. screen pixel relationships at different locations along the map data set region 460A. In particular, at midpoint hash mark 462A, a map data set pixel 470 is represented by a screen pixel 471, at hash mark 463 (above midpoint hash mark 462A), four map data set pixels 472 are represented by a screen pixel 473, and at hash mark 464 (above hash mark 463), 16 map data set pixels 474 are represented by a screen pixel 475. Below the midpoint hash mark 462A at hash mark 465, a map data set pixel 476 is represented by four screen pixels 477, and below hash mark 465 at hash mark 466, a map data set pixel 478 is represented by 16 screen pixels 479.

Figure 6:
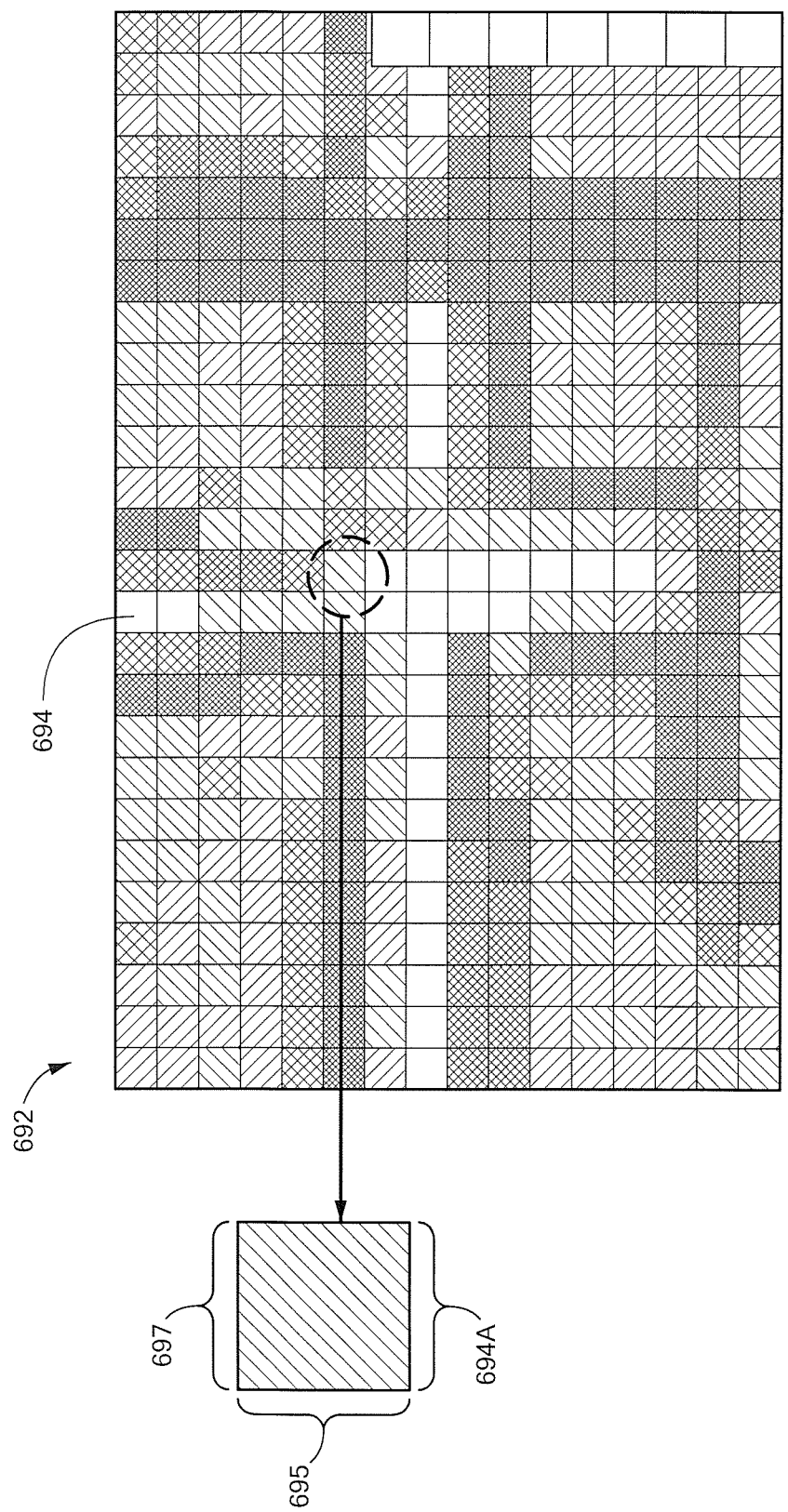
FIG. 6 is a pictorial representation of a map image and a close-up view of a map image pixel.

Referring now to FIG. 6, an extremely zoomed in view of an embodiment of a map data set 692 at a map scale of 1:100K is shown. FIG. 6 illustrates the individual pixels (an example of which is designated by reference numeral 694) of the 1:100K map imagery. An individual pixel 694A is highlighted to show a vertical geo-locational measurement 695 and a horizontal geo-locational measurement 697. In some embodiments, the vertical measurement 695 may refer to decimal latitude degrees and the horizontal measurement 697 may refer to decimal longitude degrees.

Figure 7:
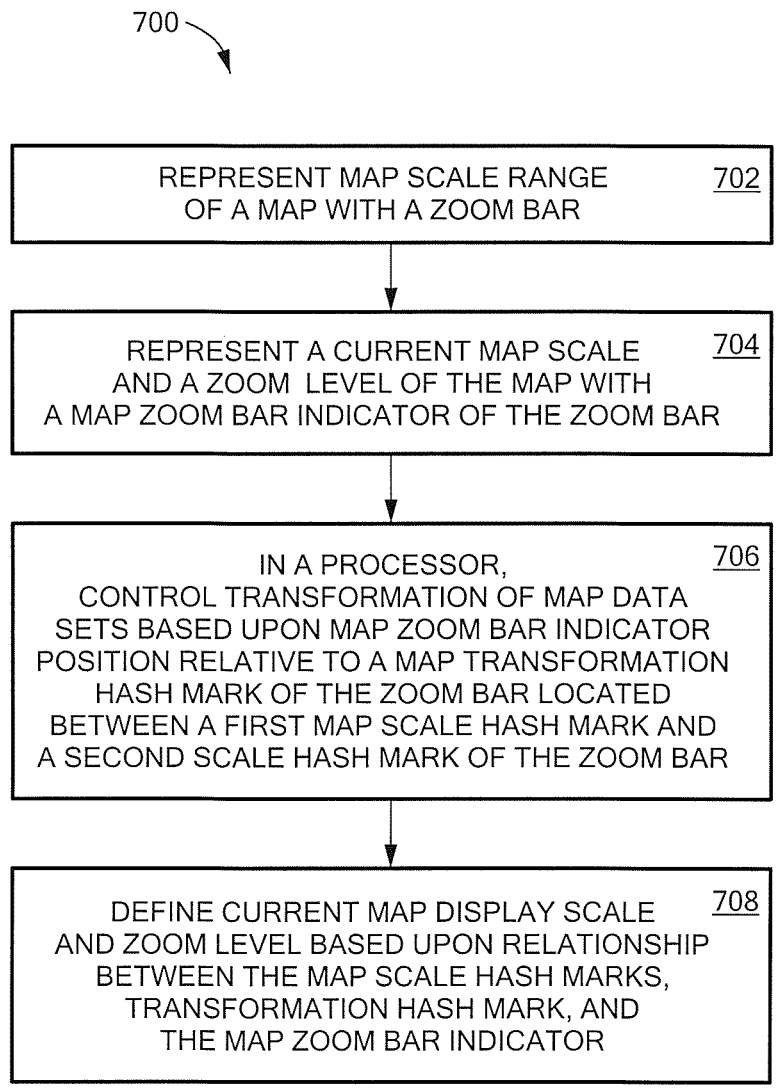
FIG. 7 is a flow diagram of an embodiment of a map zooming method.

Referring now to FIG. 7, a method 700 for map zooming includes representing a map scale range of a geographic map using a rendered zoom bar including map scale hash marks, a map transformation hash mark located between at least two of the map scale hash marks along an axis of the zoom bar, and a map zoom bar indicator (block 702) and representing a current map scale and a zoom level of the geographic map using the map zoom bar indicator (block 704). The method 700 also includes, in a processor, controlling transformation of map data sets of the geographic map from at least a first map data set to a second map data set based upon a location of the map zoom bar indicator relative to the map transformation hash mark (block 706), and defining the current map display scale and the zoom level of the current map display scale based upon predetermined relationships of locations of the map zoom bar indicator, the map scale hash marks, and the map transformation hash mark (block 708).

Figure 8A:
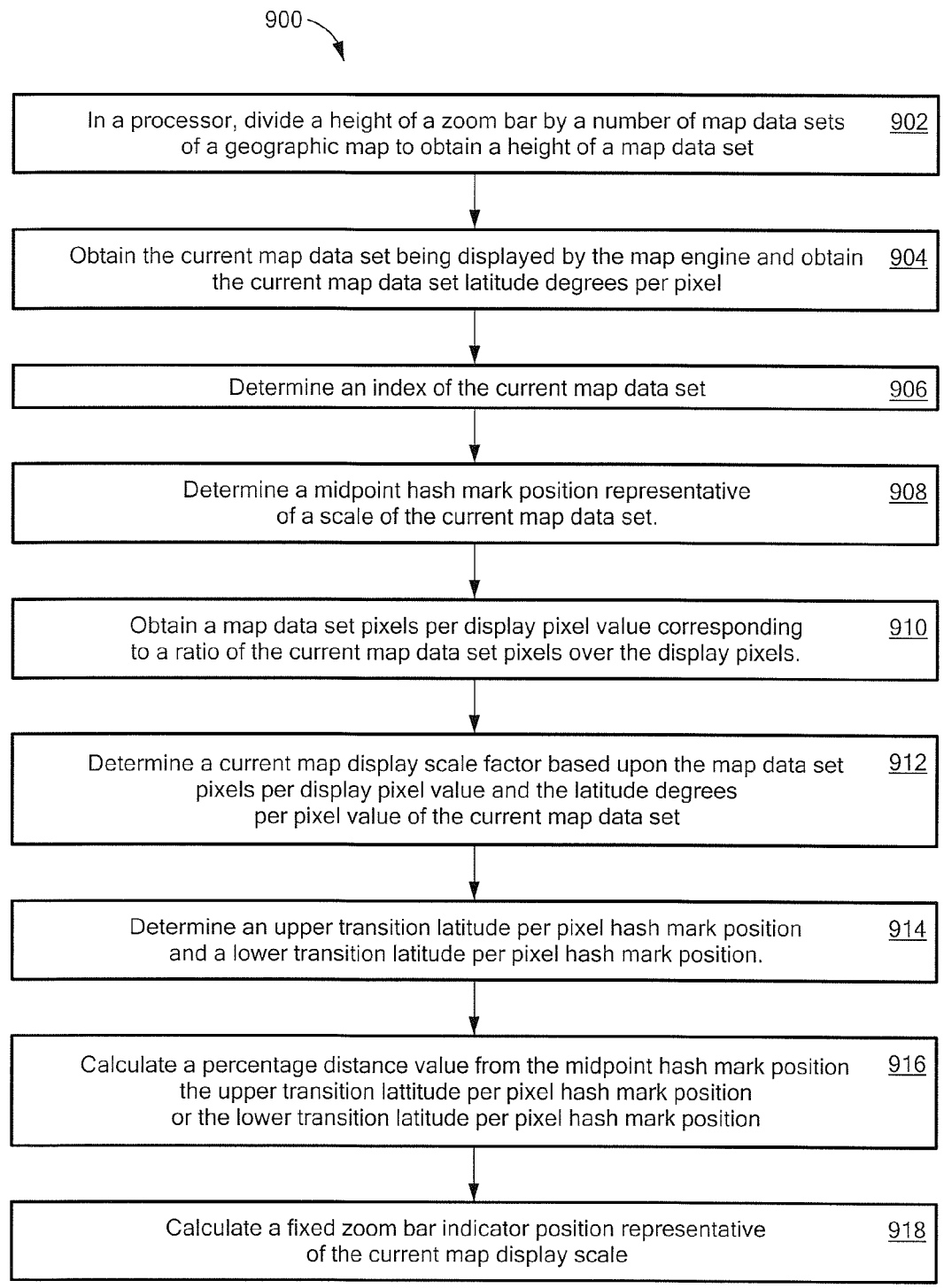
FIG. 8A is a flow diagram of yet another embodiment of a map zooming method.

In general overview, the flow diagrams of FIGS. 8A and 8B illustrate, respectively, processes to determine a position of a zoom bar indicator given a map scale factor and map zoom level and vice-versa. Thus, FIG. 9A illustrates a technique which receives inputs corresponding to a current map scale factor and map zoom level (see blocks 904 and 912 in FIG. 8A) and processes these inputs to provide an output corresponding to a position of a zoom bar indicator while FIG. 8B illustrates a technique which receives inputs corresponding to a change in position of a zoom bar indicator and processes these inputs to provide an output corresponding to a map display scale factor and map zoom level.

Turning now to FIG. 8A, in another aspect, a method of map zooming 900 is provided that determines a height, in zoom bar pixels, of a fixed zoom bar indicator of a zoom bar (as may be similar to zoom bar 102 described in conjunction with FIG. 1) used to control scaling and zooming of a displayed map. The method 900 may be used when map data sets are added and/or removed from the zoom bar or when a user changes the position of the zoom bar indicator via UI interaction (which would be a common reason for a zoom bar position invalidation), invalidating the current location of the fixed zoom bar indicator. Such actions require calculation of a new position for the zoom bar indicator given the current map display state and the newly updated zoom bar.

The method 900 includes, in a processor, dividing the height of a zoom bar by the number of map data sets of a geographic map to obtain a zoom bar map data set height (block 902), and obtaining the current map data set being displayed by the map engine (hereinafter, referred to as the "current map data set") and the current map data set latitude degrees per pixel (block 904). If the zoom bar has N map data sets, then the index of the bottom map data set begins with 0 and the index of the top map data set ends with N−1. The method 900 further includes finding the index that the current map data set corresponds to (block 906), which may be referred to as the "current map data set index", and a midpoint hash mark position representative of a scale of the current map data set (block 908).

The method 900 further includes obtaining a map data set pixels per display pixel value corresponding to a ratio of the current map data set pixels over the display pixels (block 910). This value may be obtained from the current state of the map engine given its scaling of the display coordinate system relative to the map data set coordinate system on the vertical axis.

Next, the method 900 includes determining a current map display scale factor based upon the map data set pixels per display pixel value and the latitude degrees per pixel value of the current map data set (block 912). The method 900 further includes determining an upper transition latitude per pixel hash mark position and a lower transition latitude per pixel hash mark position representative of a display range of the current map data set (block 914)

The method 900 further includes calculating a percentage distance value from the midpoint hash mark position to one of the upper transition latitude per pixel hash mark position or lower transition latitude per pixel hash mark position based upon the map data set pixels per display pixel value (block 916), and calculating a fixed zoom bar indicator position representative of the current map display scale (block 918).

Referring now to FIG. 8B, in a further embodiment a method 920 is provided to determine a state of a map display using scale and zoom information of a zoom bar, as may be similar to the zoom bar described above with reference to FIG. 9A. State information of the map includes, but is not limited to, a current map data set and a current map scale factor.

The method 920 includes, in response to an input event, updating the zoom bar position by updating the midpoint hash mark position, the upper transition latitude per pixel hash mark position, and the lower transition latitude per pixel hash mark position (block 922), determining an updated current map data set based upon the updated zoom bar position (block 924), and calculating a percent fixed position value based upon a relationship of the fixed zoom bar indicator position and the upper transition latitude per pixel hash mark position when the fixed zoom bar position is greater than the midpoint hash mark position, or the fixed zoom bar indicator position and the lower transition latitude per pixel hash mark position when the fixed zoom bar position is less than the midpoint hash mark position (block 926).

Next, the method 920 includes calculating the current map display scale factor based upon the percent fixed position value (block 928). If the fixed zoom bar position is greater than the hash mark position in zoom pixels, then the current map display scale factor can be computed as follows:

Current map scale factor=1.0+(percent fixed position to upper half*(current upper transition latitude per pixel−1.0)).

If, instead, the fixed zoom bar position is less than the hash mark position in zoom pixels, then the current map display scale factor can be computed as follows:

Current map scale factor=1.0+(percent fixed position to lower half*(current lower transition latitude per pixel−1.0))

A current map data set (for example, the current map data set described in conjunction with FIG. 9A) sets the displayed map data set on the map. The current map scale factor sets the ratio of map data set pixels to display pixels to appropriately zoom the map data set on the display. Therefore, all of the information is present to correctly set the map display.

Figure 9:
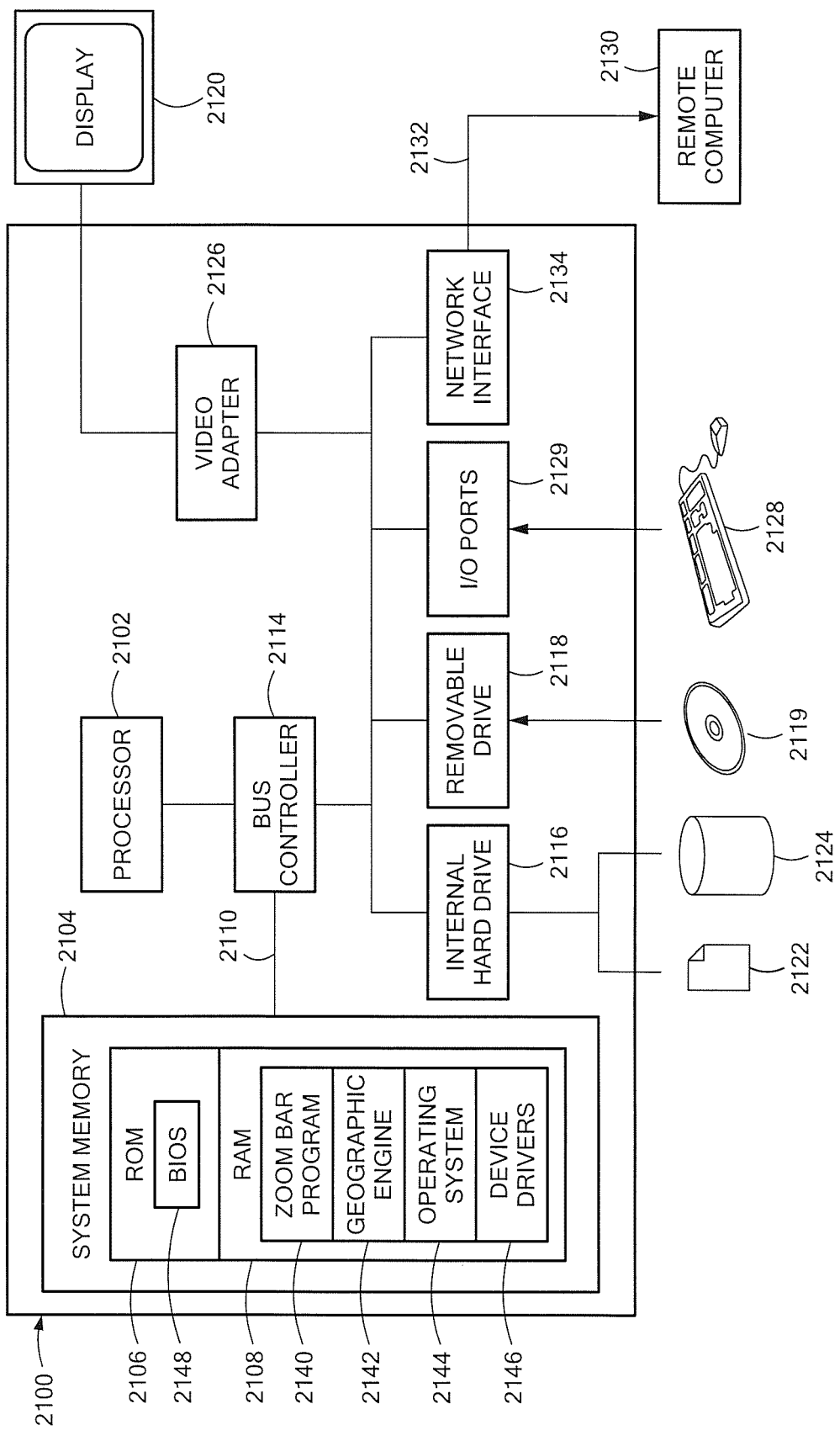
FIG. 9 is a block diagram showing an exemplary hardware and operating environment of a suitable computer for use with embodiments of the invention.

FIG. 9 illustrates a computer 2100 suitable for supporting the operation of an embodiment of the inventive systems, concepts, and techniques described herein. The computer 2100 includes a processor 2102, for example, a dual-core processor, such as the AMD Athlon™ X2 Dual Core processor from the Advanced Micro Devices Corporation. However, it should be understood that the computer 2100 may use other microprocessors. Computer 2100 can represent any server, personal computer, laptop, or even a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing embodiments of a zoom bar and map zooming method described herein. The zoom bar may be rendered and outputted to display 2120 to enable users to view the zoom bar. Further, the zoom bar may receive and/or transmit information, such as map display scale and zoom information, map data sets, map scale ranges, etc. to enable control and transformation of map data and imagery displayed in a map.

In a further embodiment, the computer 2100 may execute various processes on separate processors, such as a first processor and a second processor of dual core processor. As by way of a non-limiting example, zoom bar interactive operations (e.g. to receive and respond to user input) and graphical commands (e.g., to draw GUI components) may be executed by the first processor and map scaling and zooming computations (e.g., the output of which may be transmitted to a map engine) may be executed by the second processor. Alternatively, the first and second processors may be respective first and second computing devices.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described preferred embodiments which serve to illustrate various concepts, systems and techniques which are the subject of this patent, it will now become apparent to those of ordinary skill in the art that other embodiments incorporating these concepts, systems, and techniques may be used. Accordingly, it is submitted that the scope of the patent should not be limited to the described embodiments but rather should be limited only by the spirit and scope of the following claims.

What is claimed is:

1. An apparatus for map zooming, comprising instructions stored in a memory that when executed by a processor render a zoom bar, comprising:

a plurality of map scale hash marks arranged along an axis of the zoom bar and indicative of a map scale range of a geographic map, the plurality of map scale hash marks comprising:
  a first map scale hash mark representative of a first map scale;
  a second map scale hash mark offset along the zoom bar axis from the first map scale hash mark and representative of a second map scale; and
  a map transformation hash mark located between the first and second map scale hash marks and representative of a transformation of the geographic map from a first map data set defined with reference to the first map scale to a second map data set defined with reference to the second map scale; and
a map zoom bar indicator located relative to the first and second map scale hash marks and corresponding current map display scale and a zoom level of the geographic map wherein the geographic map includes the first map data set when the map zoom bar indicator is located on one side of the map transformation hash mark along the zoom bar axis and the geographic map includes the second map data set when the map zoom bar indicator is located on the other side of the map transformation hash mark opposing the one side.

2. The apparatus of claim 1, wherein the current map display scale corresponds to predetermined relationships of the locations of the map zoom bar indicator, at least one of the plurality of map scale hash marks, and the map transformation hash mark.

3. The apparatus of claim 1, wherein a movable portion of the zoom bar includes the plurality of map scale hash marks and the map transformation hash mark, and another fixed portion of the zoom bar includes the map zoom bar indicator.

4. The apparatus of claim 3, wherein the movable portion of the zoom bar moves in a direction parallel to the zoom bar axis.

5. The apparatus of claim 1, wherein at least one of the plurality of map scale hash marks includes a map scale hash mark line oriented in a direction orthogonal to the direction of the zoom bar movement.

6. The apparatus of claim 5, wherein the map transformation hash mark includes a line parallel to the at least one map scale hash mark line and having a length greater than the length of the at least one map scale hash mark line.

7. The apparatus of claim 1, wherein the map transformation hash mark is located midway between the first and second map scale hash marks.

8. The apparatus of claim 1, wherein the map zoom bar indicator includes an icon having a point located proximate to the plurality of map scale hash marks at a location indicative of the current map display scale.

9. An apparatus for map zooming, comprising
instructions stored in a memory that when executed by a processor render a zoom bar, comprising:
  a plurality of map scale hash marks arranged along an axis of the zoom bar and indicative of a map scale range of a geographic map, the plurality of map scale hash marks comprising:
    a first map scale hash mark representative of map scale;
    a second map scale hash mark offset along the zoom bar axis from the first map scale hash mark and representative of a second map scale; and
    a map transformation hash mark located between the first and second map scale hash marks and representative of a transformation of the geographic map from a first map data set defined with reference to the first map scale to a second map data set defined with reference to the second map scale; and
a map zoom bar indicator located relative to the first and second map scale hash marks and corresponding to a current map display scale and a zoom level of the geographic map wherein the map transformation hash mark is representative of the zoom level of the current map display scale according to $A+(B-A)/2$ where A is the value of the second map scale and B is the value of the first map scale.

10. The apparatus of claim 9, wherein the current map display scale corresponds to predetermined relationships of the locations of the map zoom bar indicator, at least one of the plurality of map scale hash marks, and the map transformation hash mark.

11. The apparatus of claim 9, wherein a movable portion of the zoom bar includes the plurality of map scale hash marks and the map transformation hash mark, and another fixed portion of the zoom bar includes the map zoom bar indicator.

12. The apparatus of claim 11, wherein the movable portion of the zoom bar moves in a direction parallel to the zoom bar axis.

13. The apparatus of claim 9, wherein at least one of the plurality of map scale hash marks includes a map scale hash mark line oriented in a direction orthogonal to the direction of the zoom bar movement.

14. The apparatus of claim 13, wherein the map transformation hash mark includes a line parallel to the at least one map scale hash mark line and having a length greater than the length of the at least one map scale hash mark line.

15. The apparatus of claim 9, wherein the map transformation hash mark is located midway between the first and second map scale hash marks.

16. An apparatus for map zooming, comprising
instructions stored in a memory that when executed by a processor render a zoom bar, comprising:
  plurality of map scale hash marks arranged along an axis of the zoom bar and indicative of a map scale range of a geographic map, the plurality of map scale hash marks comprising:
    a first map scale hash mark representative of a first map scale;
    a second map scale hash mark offset along the zoom bar axis from the first map scale hash mark and representative of a second map scale; and
    a map transformation hash mark located between the first and second map scale hash marks and representative of a transformation of the geographic map from a first map data set defined with reference to the first map scale to a second map data set defined with reference to the second map scale; and
a map zoom bar indicator located relative to the first and second map scale hash marks and corresponding to a current map display scale and a zoom level of the geographic map wherein the first map data set includes a first map imagery transformed by a ratio of first map imagery pixels to pixels of a screen displaying the first map imagery, the ratio equal to a first value when the map zoom bar indicator is proximate to the first map scale hash mark, a second value less than the first value when the map zoom bar indicator is located on one side of the first map scale hash mark along the zoom bar axis representative of map scales greater than the first map scale, and a third value greater than the first value when the map zoom bar indicator is located on the other side of the first map scale hash mark representative of map scales less than the first map scale.

17. The apparatus of claim 16, wherein the current map display scale corresponds to predetermined relationships of the locations of the map zoom bar indicator, at least one of the plurality of map scale hash marks, and the map transformation hash mark.

18. The apparatus of claim 16, wherein a movable portion of the zoom bar includes the plurality of map scale hash marks and the map transformation hash mark, and another fixed portion of the zoom bar includes the map zoom bar indicator.

19. The apparatus of claim 18, wherein the movable portion of the zoom bar moves in a direction parallel to the zoom bar axis.

20. The apparatus of claim 16, wherein at least one of the plurality of map scale hash marks includes a map scale hash mark line oriented in a direction orthogonal to the direction of the zoom bar movement.

21. The apparatus of claim 20, wherein the map transformation hash mark includes a line parallel to the at least one map scale hash mark line and having a length greater than the length of the at least one map scale hash mark line.

22. The apparatus of claim 16, wherein the map transformation hash mark is located midway between the first and second map scale hash marks.

23. An apparatus for map zooming, comprising
instructions stored in a memory that when executed by a processor render a zoom bar, comprising:
a plurality of map scale hash marks arranged along an axis of the zoom bar and indicative of a map scale range of a geographic map, the plurality of map scale hash marks comprising:
a first map scale hash mark representative of a first map scale;
a second map scale hash mark offset along the zoom bar axis from the first map scale hash mark and representative of a second map scale; and
a map transformation hash mark located between the first and second map scale hash marks and representative of a transformation of the geographic map from a first map data set defined with reference to the first map scale to a second map data set defined with reference to the second map scale; and
a map zoom bar indicator located relative to the first and second map scale hash marks and corresponding to a current map display scale and a zoom level of the geographic map wherein the zoom level of the current map display scale corresponds to a first predetermined relationship when the map zoom bar indicator is located between the first map scale hash mark and the map transformation hash mark, and the zoom level of the current map display scale corresponds to a second predetermined relationship when the map zoom bar indicator is located between the second map scale hash mark and the map transformation hash mark.

24. The apparatus of claim 23, wherein the first predetermined relationship corresponds to a ratio of the distance between the map zoom bar indicator and one of the first map scale hash mark or the map transformation hash mark and the overall distance between the first map scale hash mark and the map transformation hash mark, and the second predetermined relationship corresponds to a ratio of the distance between the map zoom bar indicator and one of the second map scale hash mark or the map transformation hash mark and the overall distance between the second map scale hash mark and the map transformation hash mark.

25. The apparatus of claim 23, wherein the current map display scale corresponds to predetermined relationships of the locations of the map zoom bar indicator, at least one of the plurality of map scale hash marks, and the map transformation hash mark.

26. The apparatus of claim 23, wherein a movable portion of the zoom bar includes the plurality of map scale hash marks and the map transformation hash mark, and another fixed portion of the zoom bar includes the map zoom bar indicator.

27. The apparatus of claim 26, wherein the movable portion of the zoom bar moves in a direction parallel to the zoom bar axis.

28. The apparatus of claim 23, wherein at least one of the plurality of map scale hash marks includes a map scale hash mark line oriented in a direction orthogonal to the direction of the zoom bar movement.

29. The apparatus of claim 28, wherein the map transformation hash mark includes a line parallel to the at least one map scale hash mark line and having a length greater than the length of the at least one map scale hash mark line.

30. The apparatus of claim 23, wherein the map transformation hash mark is located midway between the first and second map scale hash marks.

31. A machine-based method for map zooming, comprising
representing a map scale range of a geographic map using a rendered zoom bar including map scale hash marks, a map transformation hash mark located between at least two of the map scale hash marks along an axis of the zoom bar, and a map zoom bar indicator;
representing a current map scale and a zoom level of the geographic map using the map zoom bar indicator;
in a processor, controlling transformation of map data sets of the geographic map from at least a first map data set to a second map data set based upon a location of the map zoom bar indicator relative to the map transformation hash mark; and defining the current map display scale and the zoom level of the current map display scale based upon predetermined relationships of locations of the map zoom bar indicator, the map scale hash marks, and the map transformation hash mark wherein said controlling transformation of map data sets is based upon a map transformation scale according to $A+(B-A)/2$ where A corresponds to a scale of the second map data set and B corresponds to a scale of the first map data set.

32. The machine-based method of claim 31, wherein said representing of the map scale range further includes providing the map scale hash marks as lines oriented in a direction orthogonal to the axis of the zoom bar.

33. The machine-based method of claim 32, wherein the map transformation hash mark includes a line parallel to the map scale hash mark lines, the map transformation hash mark line located midway between a first one of the map scale hash mark lines and a second one of the map scale hash mark lines and having a length that is larger than the length of the first or second one of the map scale hash mark lines.

34. The machine-based method of claim 31, further comprising:
controlling the current map display scale and the zoom level by moving a portion of the zoom bar including the map scale hash marks and the map transformation hash mark relative to a fixed portion of the zoom bar including the map zoom bar indicator.

35. The machine-based method of claim 34, wherein said controlling further includes sliding the movable portion of the zoom bar in a direction parallel to the zoom bar axis.

36. A machine-based method for map zooming, comprising
representing a map scale range of a geographic map using a rendered zoom bar including map scale hash marks, a map transformation hash mark located between at least two of the map scale hash marks along an axis of the zoom bar, and a map zoom bar indicator;

representing a current map scale and a zoom level of the geographic map using the map zoom bar indicator;

in a processor, controlling transformation of map data sets of the geographic map from at least a first map data set to a second map data set based upon a location of the map zoom bar indicator relative to the map transformation hash mark; and defining the current map display scale and the zoom level of the current map display scale based upon predetermined relationships of locations of the map zoom bar indicator, the map scale hash marks, and the map transformation hash mark wherein the first map data set includes a first map imagery when the map zoom bar indicator is located on a first side of the map transformation hash mark along the zoom bar axis and includes a second map data set when the map zoom bar indicator is located on a second side of the map transformation hash mark opposing the first side.

37. The machine-based method of claim 36, wherein said controlling transformation of map data sets further includes:

controlling transformation of the first map imagery according to a ratio of first map imagery pixels to pixels of a screen displaying the first map imagery, the ratio equal to a first value when the map zoom bar indicator is proximate to a first one of the map scale hash marks, a second value less than the first value when the map zoom bar indicator is located on one side of the first one of the map scale hash marks, and a third value greater than the first value when the map zoom bar indicator is located on the other side of the first one of the map scale hash marks.

38. The machine-based method of claim 36, wherein said representing of the map scale range further includes providing the map scale hash marks as lines oriented in a direction orthogonal to the axis of the zoom bar.

39. The machine-based method of claim 36, further comprising:

controlling the current map display scale and the zoom level by moving a portion of the zoom bar including the map scale hash marks and the map transformation hash mark relative to a fixed portion of the zoom bar including the map zoom bar indicator.

40. A machine-based method for map zooming, comprising representing a map scale range of a geographic map using a rendered zoom bar including map scale hash marks, a map transformation hash mark located between at least two of the map scale hash along an axis of the zoom bar, and a map zoom bar indicator;

representing a current map scale and a zoom level of the geographic map using the map zoom bar indicator;

in a processor, controlling transformation of map data sets of the geographic map from at least a first map data set to a second map data set based upon a location of the map zoom bar indicator relative to the map transformation hash mark; and defining the current map display scale and the zoom level of the current map display scale based upon predetermined relationships of locations of the map zoom bar indicator, the map scale hash marks, and the map transformation hash mark wherein said defining the zoom level of the current map display scale is based upon a first predetermined relationship when the map zoom bar indicator is located between a first one of the map scale hash marks and the map transformation hash mark, and a second predetermined relationship when the map zoom bar indicator is located between a second one of the map scale hash marks and the map transformation hash mark.

41. The machine-based method of claim 40, wherein the first predetermined relationship corresponds to a ratio of the distance between the map zoom bar indicator and the first one of the map scale hash marks or the map transformation hash mark and the overall distance between the first one of the map scale hash marks and the map transformation hash mark, and the second predetermined relationship corresponds to a ratio of the distance between the map zoom bar indicator and the second one of the map scale hash marks or the map transformation hash mark and the overall distance between the second one of the map scale hash mark and the map transformation hash mark.

42. The machine-based method of claim 40, wherein said representing of the map scale range further includes providing the map scale hash marks as lines oriented in a direction orthogonal to the axis of the zoom bar.

43. The machine-based method of claim 40, further comprising:

controlling the current map display scale and the zoom level by moving a portion of the zoom bar including the map scale hash marks and the map transformation hash mark relative to a fixed portion of the zoom bar including the map zoom bar indicator.

44. A method of map zooming, comprising:

in a processor, dividing a height of a zoom bar by a number of map data sets of a geographic map to obtain a height of a map data set;

obtaining a current map data set being displayed in a geographic map and a latitude degrees per pixel value of the current map data set;

determining an index of the current map data set and a midpoint hash mark position representative of a scale of the current map data set;

obtaining a map data set pixels per display pixel value corresponding to a ratio of the current map data set pixels over the display pixels;

determining a current map display scale factor based upon the map data set pixels per display pixel value and the latitude degrees per pixel value of the current map data set;

determining an upper transition latitude per pixel hash mark position and a lower transition latitude per pixel hash mark position representative of a display range of the current map data set;

calculating a percentage distance value from the midpoint hash mark position to one of the upper transition latitude per pixel hash mark position or lower transition latitude per pixel hash mark position based upon the map data set pixels per display pixel value; and calculating a zoom bar indicator position representative of the current map display scale.

45. The method of claim 44, further comprising:

rendering the zoom bar having an axis in a major dimension centered at the zoom bar position; and arranging along the zoom bar axis a midpoint hash mark located at the midpoint hash mark position, a upper transition latitude per pixel hash mark at the upper transition latitude per pixel hash mark position, and a the lower transition latitude per pixel hash mark at the lower transition latitude per pixel hash mark position.

46. The method of claim 45, further comprising:

in response to an input event, updating the zoom bar position by updating the midpoint hash mark position, the upper transition latitude per pixel hash mark position, and the lower transition latitude per pixel hash mark position;

determining an updated current map data set based upon the updated zoom bar position;

calculating a percent fixed position value based upon a relationship of the zoom bar indicator position and the upper transition latitude per pixel hash mark position when the zoom bar position is greater than the midpoint hash mark position, or a relationship of the zoom bar indicator position and the lower transition latitude per pixel hash mark position when the zoom bar position is less than the midpoint hash mark position, and;

calculating the current map display scale factor based upon the percent fixed position value.

47. The method of claim 46, wherein the input event corresponds to an interactive movement of a portion of the rendered zoom bar including the midpoint hash mark, the upper transition latitude per pixel hash mark, and the lower transition latitude per pixel hash mark.

48. The method of claim 47, wherein another portion of the rendered zoom bar including the zoom bar indicator is fixed.

49. The method of claim 45, further comprising:

outputting the current map data set and the current map display factor to enable rendering of the geometric map.

* * * * *